United States Patent
Hamada

(10) Patent No.: US 9,226,135 B2
(45) Date of Patent: Dec. 29, 2015

(54) COMMUNICATION DEVICE, COMMUNICATION METHOD, AND COMPUTER PROGRAM FOR CAUSING COMPUTER TO EXECUTE COMMUNICATION METHOD

(71) Applicant: Canon Kabushiki Kaisha, Tokyo (JP)

(72) Inventor: Masashi Hamada, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 14/084,379

(22) Filed: Nov. 19, 2013

(65) Prior Publication Data

US 2014/0080426 A1    Mar. 20, 2014

Related U.S. Application Data

(63) Continuation of application No. 11/782,147, filed on Jul. 24, 2007, now Pat. No. 8,611,315.

(30) Foreign Application Priority Data

Jul. 31, 2006  (JP) .................................. 2006-208495

(51) Int. Cl.

| | | |
|---|---|---|
| *H04W 4/00* | (2009.01) | |
| *H04W 8/22* | (2009.01) | |
| *H04W 72/02* | (2009.01) | |
| *H04W 88/06* | (2009.01) | |
| *H04W 76/02* | (2009.01) | |
| *H04W 84/18* | (2009.01) | |
| *H04W 88/10* | (2009.01) | |
| *H04W 8/00* | (2009.01) | |
| *H04W 84/12* | (2009.01) | |
| *H04W 88/08* | (2009.01) | |
| *H04W 72/04* | (2009.01) | |
| *H04W 92/18* | (2009.01) | |

(52) U.S. Cl.
CPC ................ *H04W 8/22* (2013.01); *H04W 72/02* (2013.01); *H04W 76/02* (2013.01); *H04W 88/06* (2013.01); *H04W 8/005* (2013.01); *H04W 72/0486* (2013.01); *H04W 84/12* (2013.01); *H04W 84/18* (2013.01); *H04W 88/08* (2013.01); *H04W 88/10* (2013.01); *H04W 92/18* (2013.01)

(58) Field of Classification Search
CPC ... H04W 88/06; H04W 84/18; H04W 76/023; H04W 88/08; H04W 84/20; H04W 88/04; H04W 84/12; H04W 8/005; H04W 92/18; H04W 40/12; H04W 40/246; H04W 88/02; H04W 88/10; H04W 92/10; H04W 36/0011; H04W 24/08; H04W 72/02; H04W 84/10; H04W 88/12; H04W 40/24; H04W 48/16; H04W 48/18
USPC ............ 455/41.2, 552.1, 168.1, 435.1, 435.2, 455/515, 550.1, 553.1; 370/338, 328, 329
See application file for complete search history.

(56) References Cited

U.S. PATENT DOCUMENTS 5,666,661 A * 9/1997 Grube et al. .................. 455/509
7,194,263 B2 * 3/2007 Bahl et al. .................. 455/432.1
(Continued)

*Primary Examiner* — Olumide T Ajibade Akonai
(74) *Attorney, Agent, or Firm* — Canon USA Inc. IP Division

(57) ABSTRACT

A communication device has a plurality of operation modes and a plurality of communication modes. The plurality of communication modes includes a first communication mode, in which a terminal station in a wireless network carries out communications via a control station, and a second communication mode, in which a plurality of terminal stations carry out communications with each other directly without an intervening control station. The communication device connects to at least one other communication device either in the first communication mode or the second communication mode, and switches an operation mode when a communication mode is switched.

19 Claims, 25 Drawing Sheets

(56) References Cited

U.S. PATENT DOCUMENTS

| | | | |
|---|---|---|---|
| 7,248,570 B2 * | 7/2007 | Bahl et al. | 370/329 |
| 7,522,551 B2 * | 4/2009 | Giaimo et al. | 370/328 |
| 8,611,315 B2 * | 12/2013 | Hamada | 370/338 |
| 2004/0063458 A1 * | 4/2004 | Hori et al. | 455/554.2 |
| 2006/0058059 A1 * | 3/2006 | Kim | 455/550.1 |
| 2006/0109815 A1 * | 5/2006 | Ozer et al. | 370/329 |
| 2006/0215576 A1 * | 9/2006 | Yu et al. | 370/252 |
| 2007/0140191 A1 * | 6/2007 | Kojima | 370/338 |

* cited by examiner

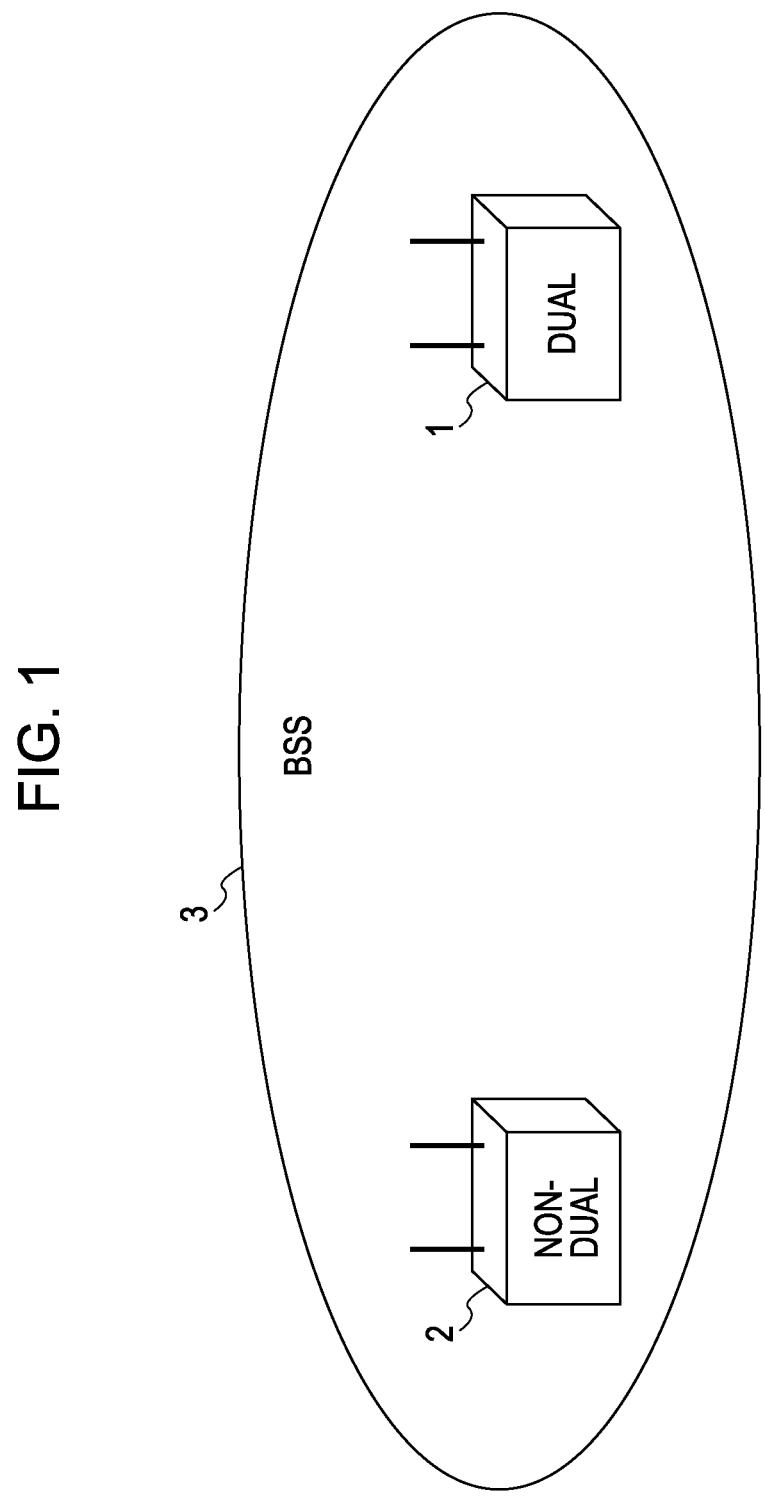

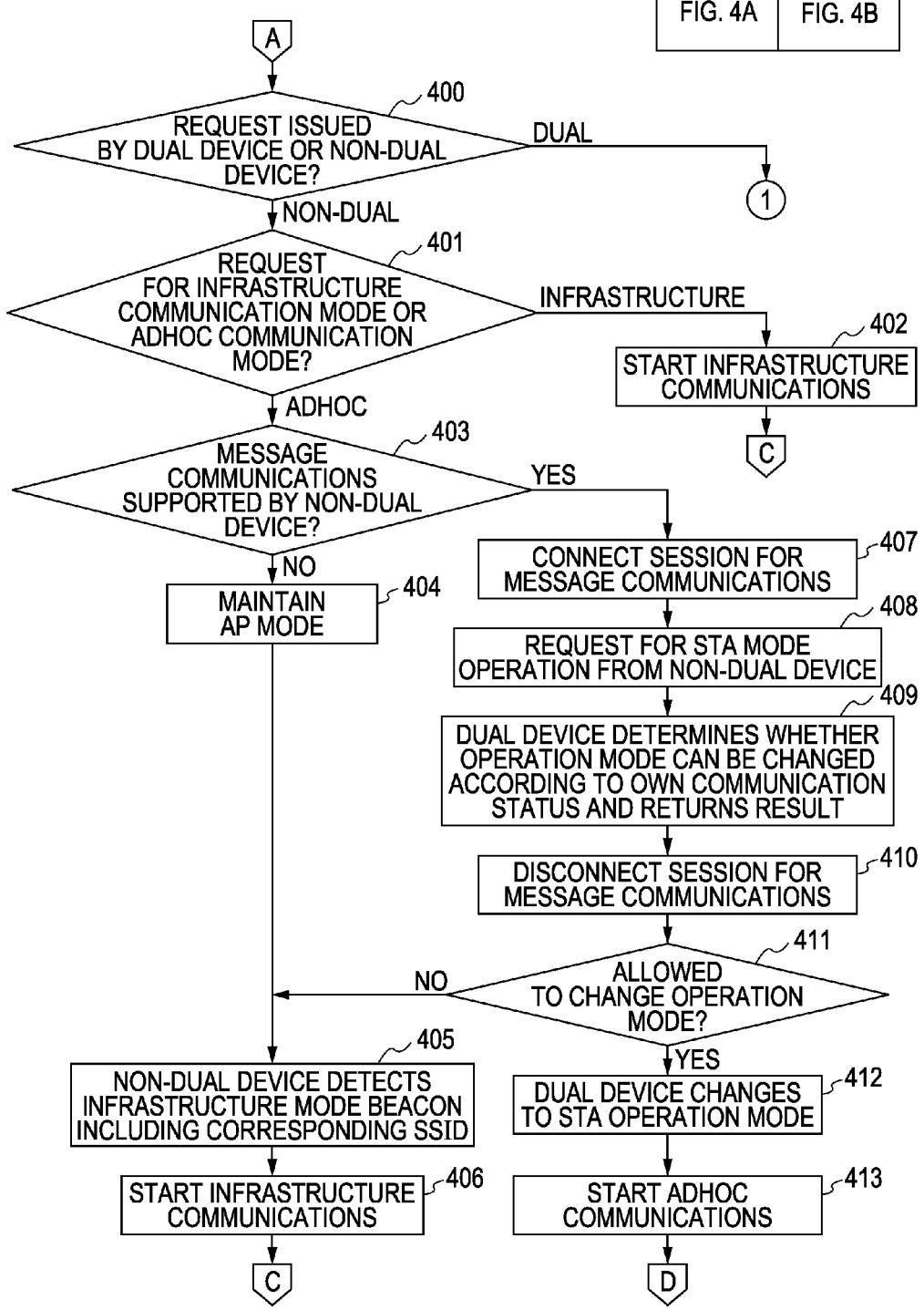

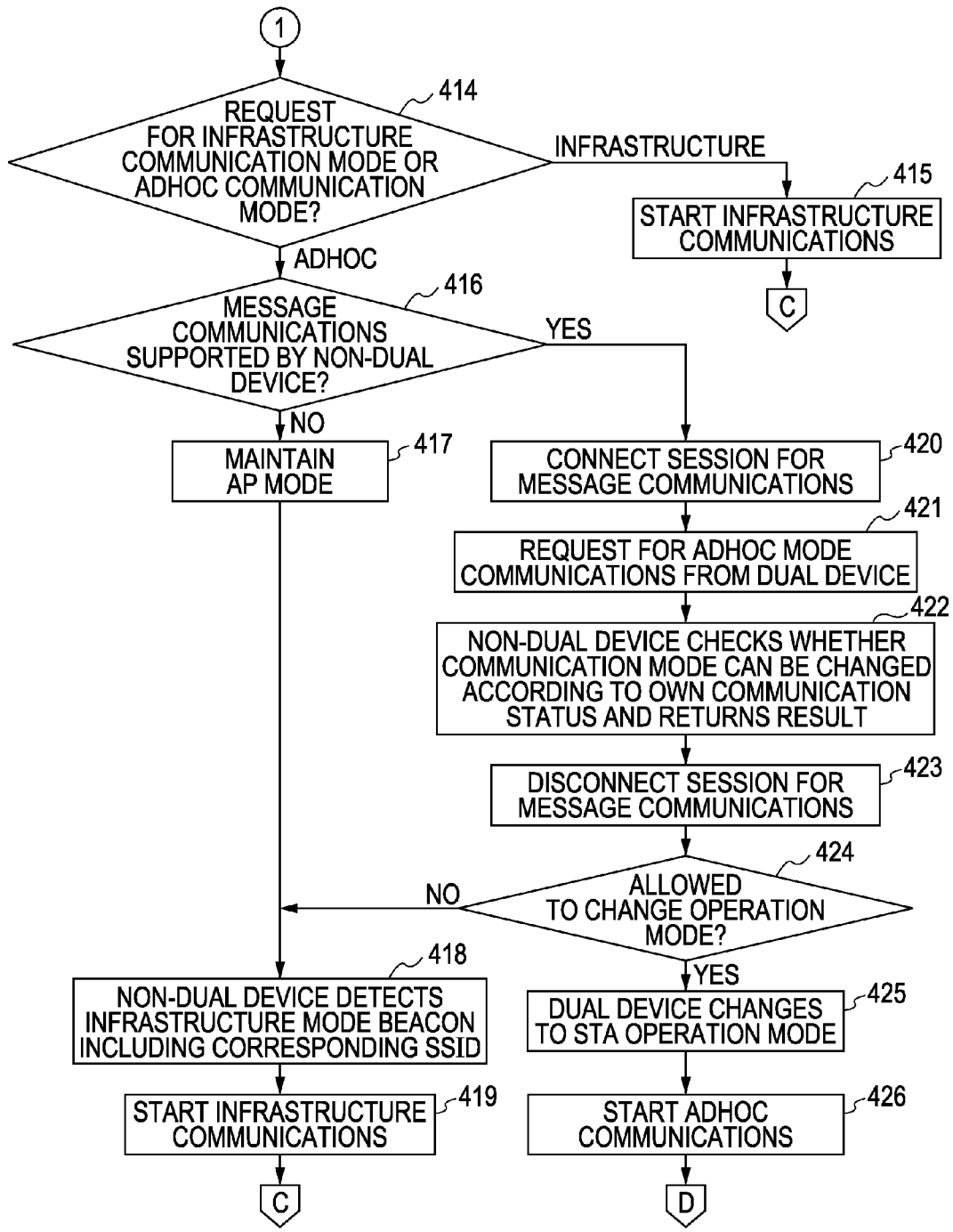

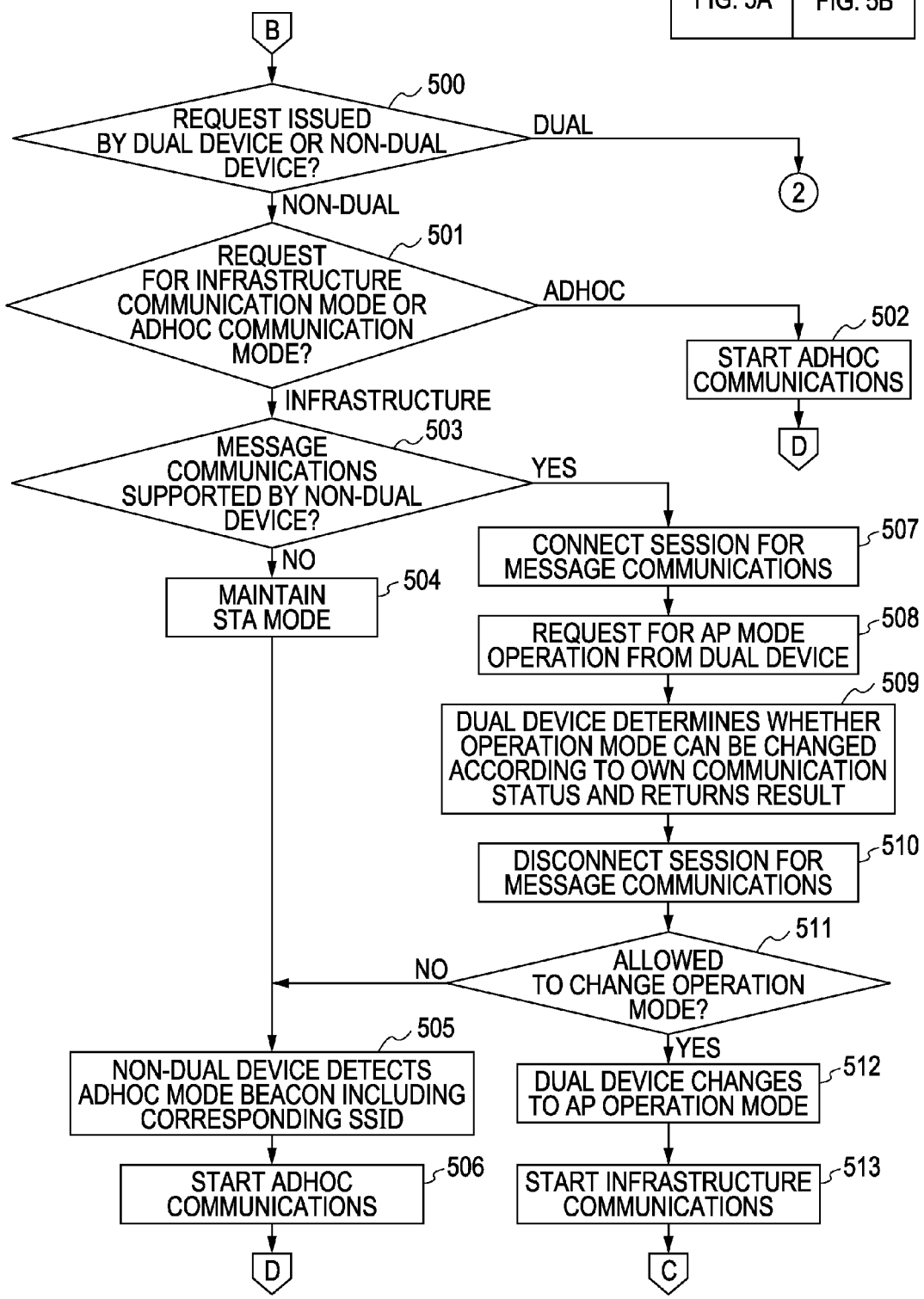

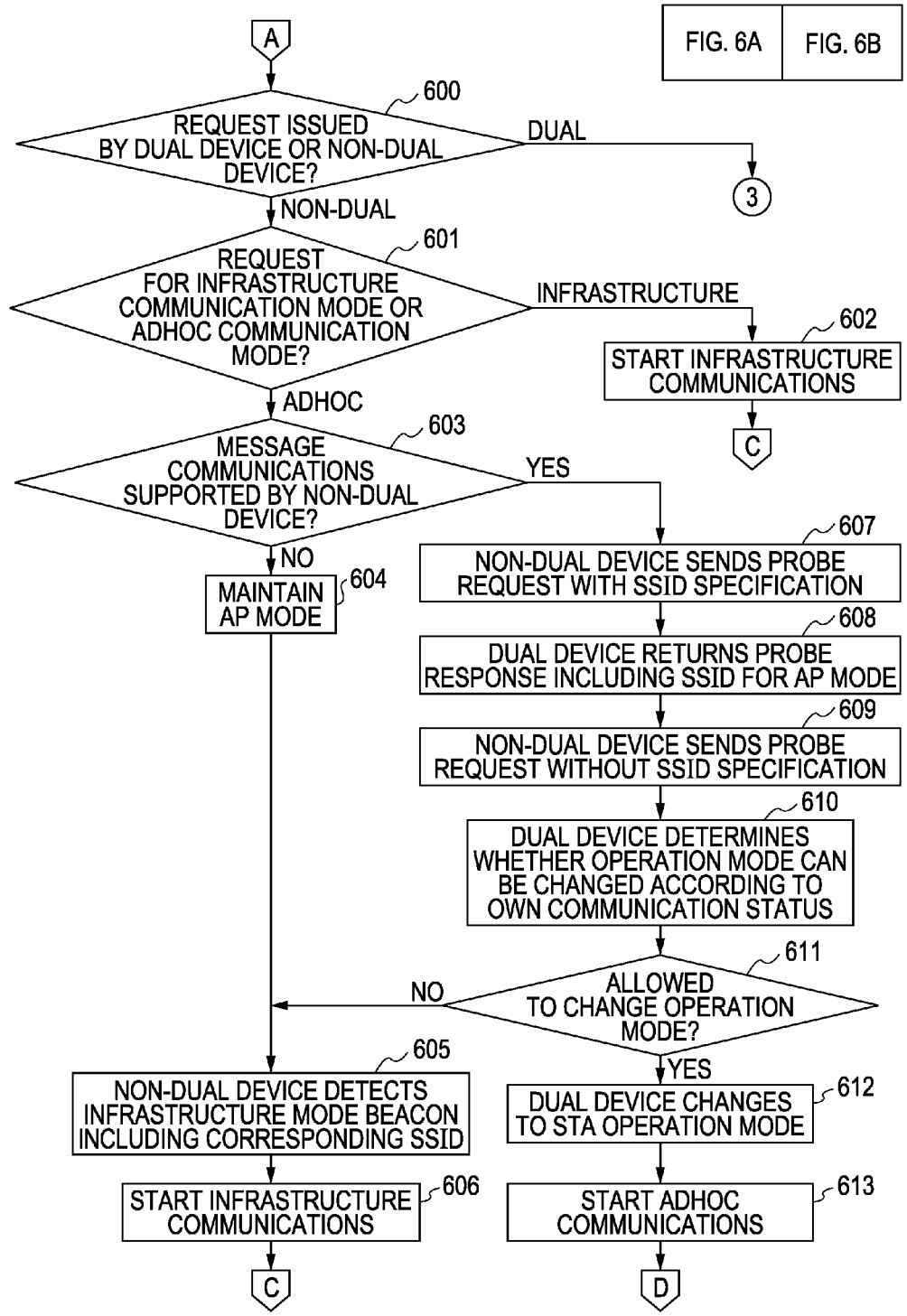

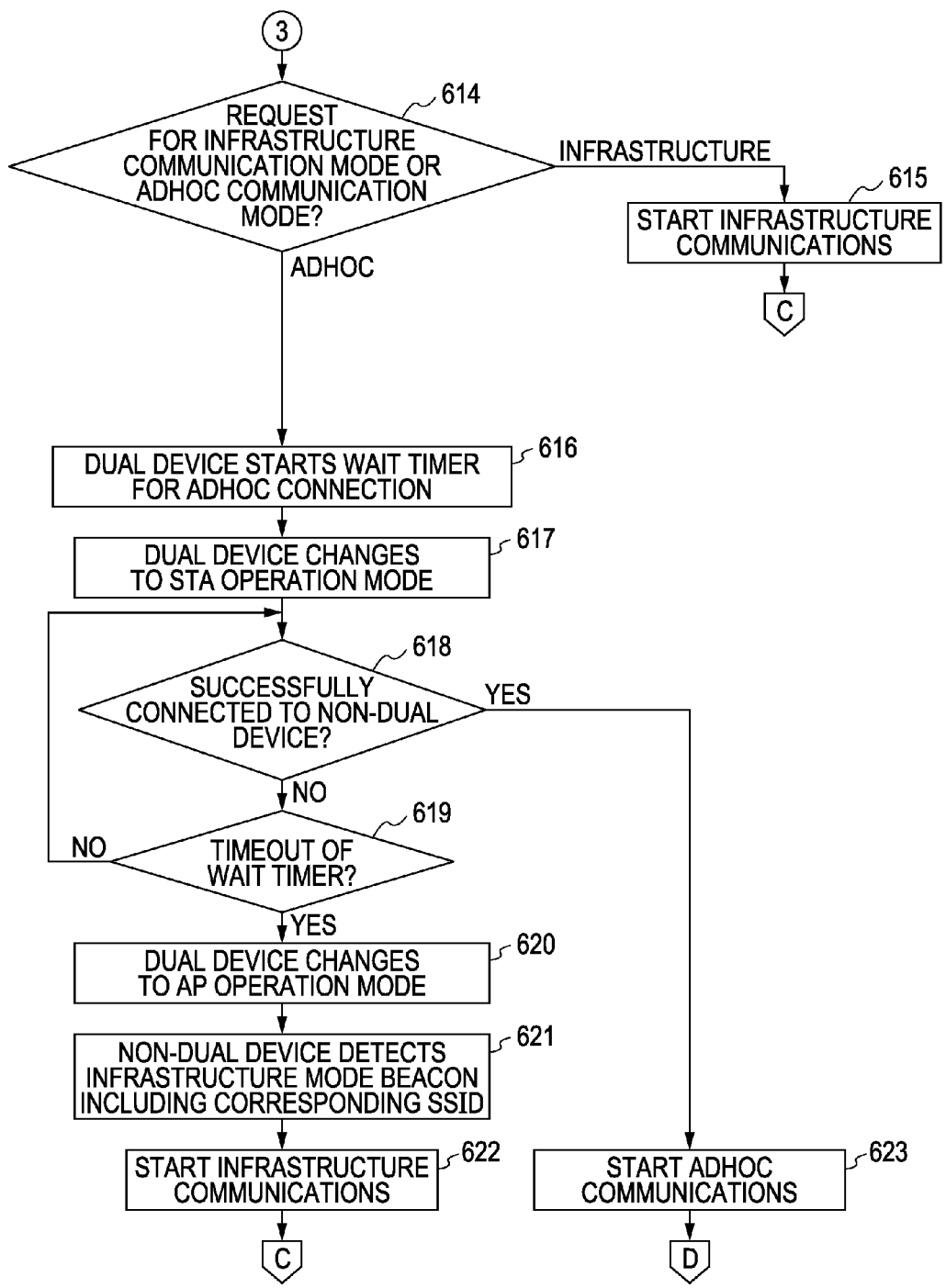

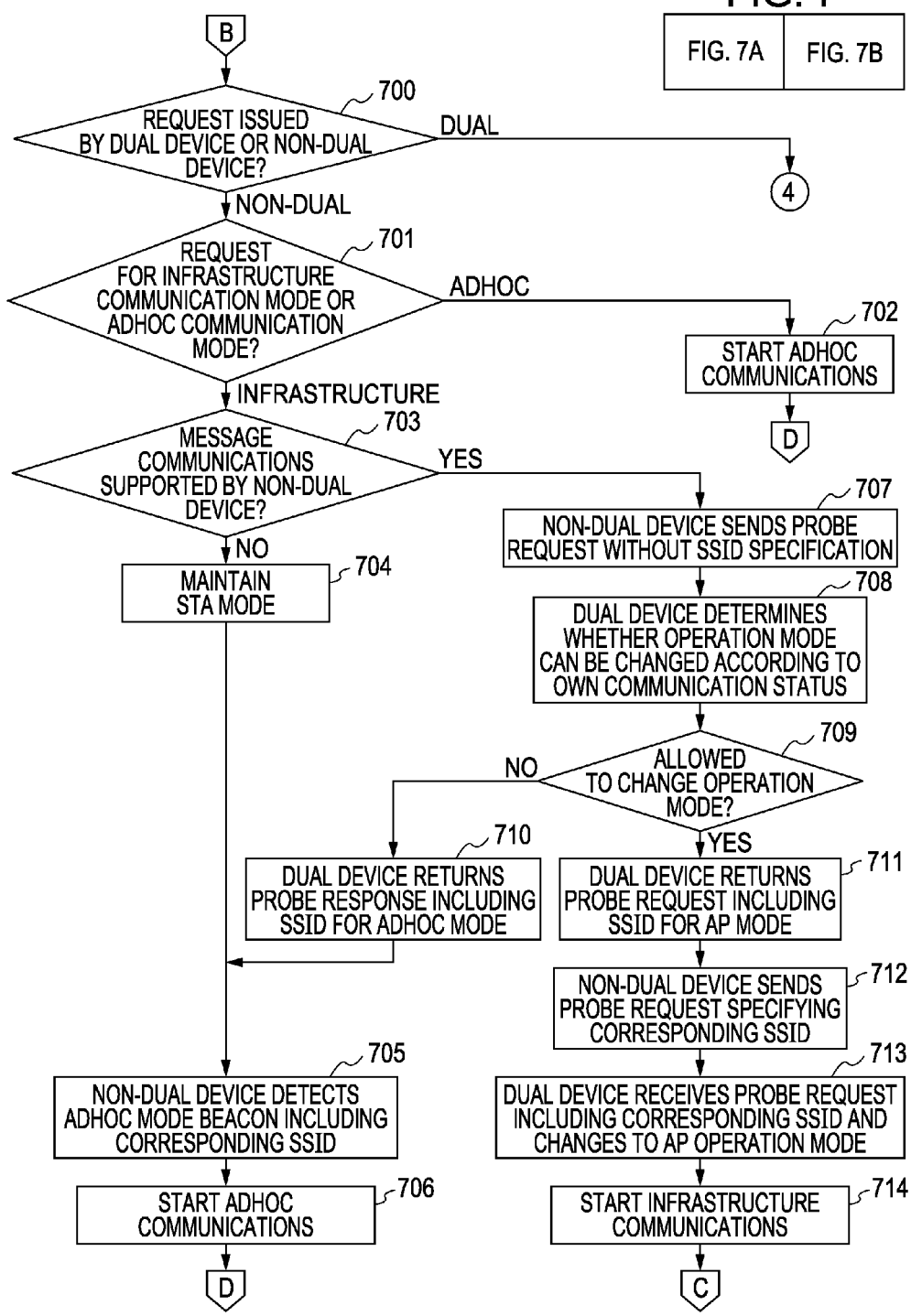

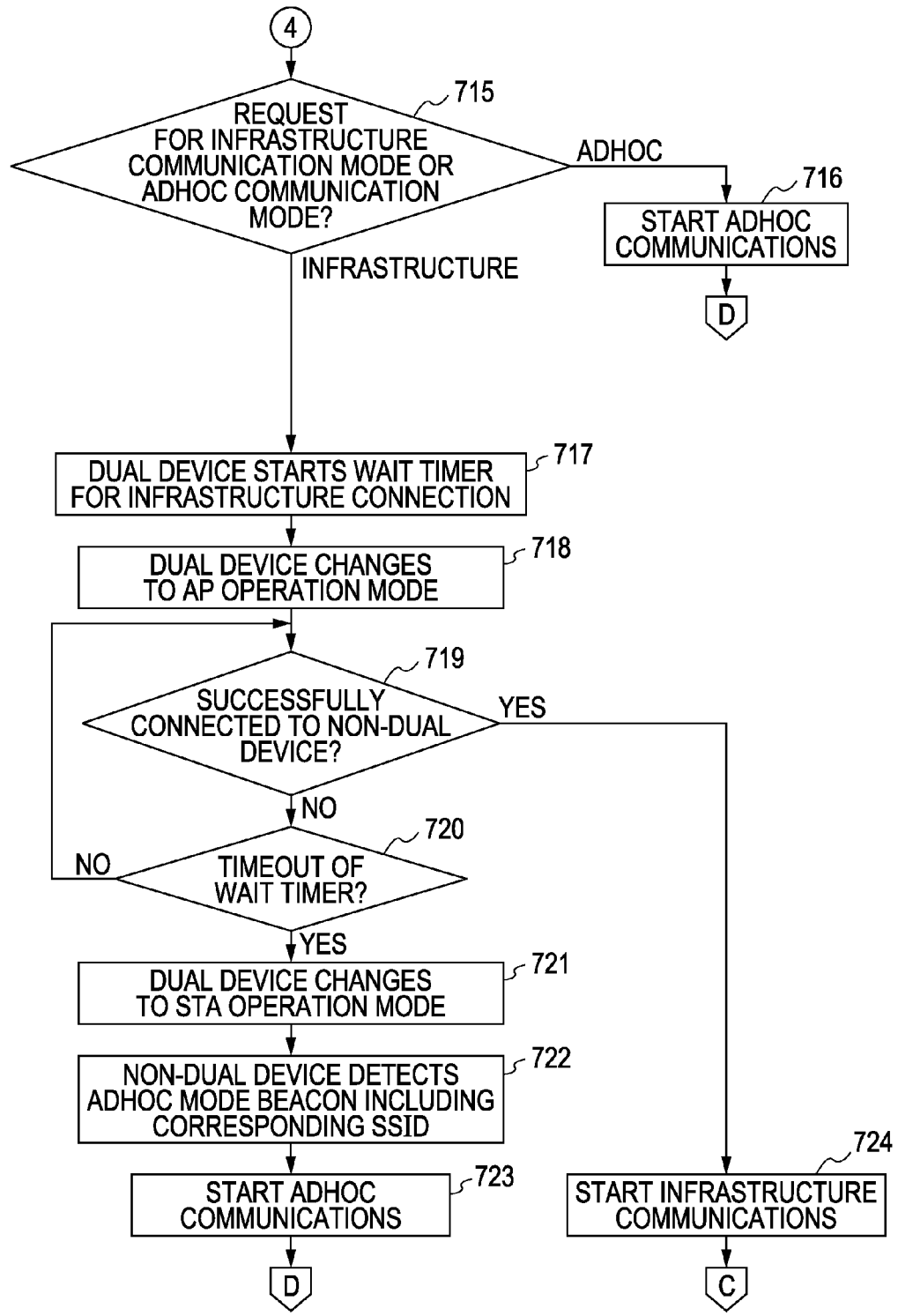

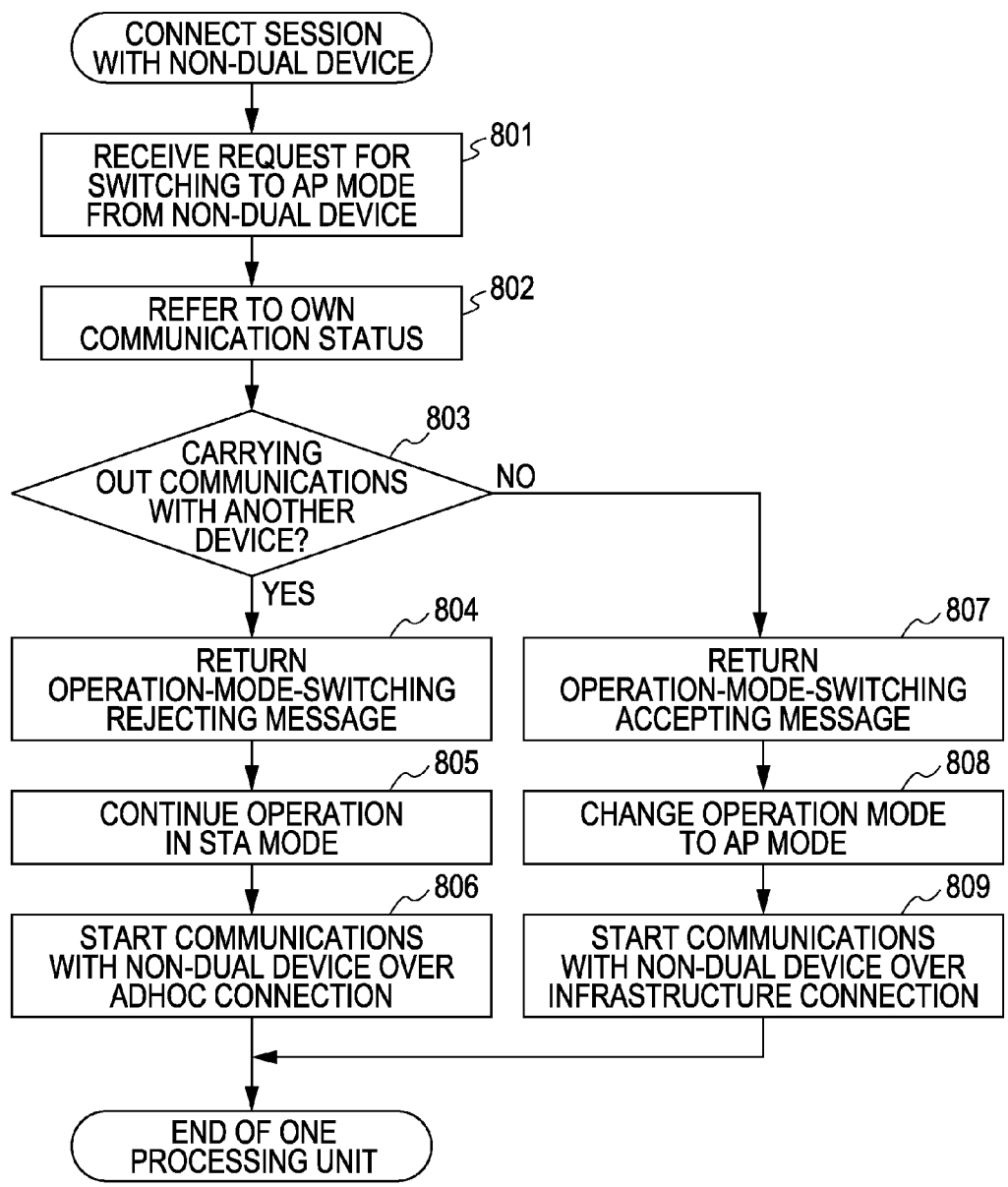

COMMUNICATION DEVICE, COMMUNICATION METHOD, AND COMPUTER PROGRAM FOR CAUSING COMPUTER TO EXECUTE COMMUNICATION METHOD

CROSS REFERENCE TO RELATED APPLICATIONS

This application is a Continuation of U.S. patent application Ser. No. 11/782,147 filed Jul. 24, 2007, which claims the benefit of Japanese Patent Application No. 2006-208495 filed Jul. 31, 2006, both of which are hereby incorporated by reference in their entirety.

BACKGROUND OF THE INVENTION

1. Field of the Invention

The present invention relates to a communication device, a communication method, and a computer program for causing a computer to execute the communication method.

2. Description of the Related Art

In an IEEE 802.11 wireless LAN system, two communication modes are used, namely, an infrastructure mode, in which terminal stations carry out communications via control stations called access points (APs), and an adhoc mode, in which terminal stations carry out communications directly with each other without intervening APs. This is described, for example, in Japanese Patent Laid-Open No. 2003-348103.

Without limitation to wireless LANs, there exist communication systems having two communication modes, namely, a communication mode in which terminal stations carry out communications via control stations, and a communication mode in which terminal stations carry out communications directly with each other without intervening control stations. This is described, for example, in Japanese Patent Laid-Open No. 5-153039.

In the wireless LAN system, for example, a communication device has an AP mode, in which the communication device operates as an AP, and an STA mode, in which the communication device operates as a terminal station, and selects either the AP mode or the STA mode to carry out communications.

Such a communication device having a plurality of operation modes is activated in a predetermined operation mode, and connects to another communication device in a communication mode corresponding to the operation mode in which the communication device is activated. However, the communication mode of the connection does not necessarily match a desired communication mode. Furthermore, even when it is desired to switch the communication mode, when one of the devices is not capable of recognizing switching or is already carrying out communications with another device, communications that have been going on are suddenly interrupted when one of the devices unilaterally switches the communication mode.

SUMMARY OF THE INVENTION

The present invention provides a communication device, a communication method, and a computer program with which communications are carried out in an appropriate communication mode when a communication device having a plurality of operation modes and a plurality of communication modes carries out communications with another communication device.

According to an aspect of the present invention, there is provided a method of enabling a first device to communicate with at least a second device, the first device having a plurality of operation modes and a plurality of communication modes, the plurality of operation modes including a control station mode, in which the first device operates as a control station in a wireless network, and a terminal station mode, in which the first device operates as a terminal station in the wireless network, and the plurality of communication modes including a first communication mode, in which a terminal station in the wireless network carries out communications via a control station, and a second communication mode, in which a plurality of terminal stations carry out communications with each other directly without an intervening control station. The method includes connecting to the at least second device in either the first communication mode or the second communication mode, and switching an operation mode when a communication mode is switched.

According to another aspect of the present invention, there is provided a device having a plurality of operation modes and a plurality of communication modes, the plurality of operation modes including a control station mode, in which the device operates as a control station in a wireless network, and a terminal station mode, in which the device operates as a terminal station in the wireless network, and the plurality of communication modes including a first communication mode, in which a terminal station in the wireless network carries out communications via a control station, and a second communication mode, in which a plurality of terminal stations carries out communications with each other directly without an intervening control station. The device includes a connecting unit configured to connect to at least one other device either in the first communication mode or the second communication mode, and a switching unit configured to switch an operation mode when a communication mode is switched.

Further features of the present invention will become apparent from the following description of exemplary embodiments with reference to the attached drawings.

BRIEF DESCRIPTION OF THE DRAWINGS

FIG. 1 is a diagram illustrating a system configuration according to an embodiment of the present invention.

FIGS. 4A and 4B illustrate flows of processing executed in a case where a communication start request is detected while the dual device is operating in an AP mode in a first embodiment.

FIGS. 5A and 5B illustrate flows of processing executed in a case where a communication start request is detected while the dual device is operating in the STA mode in the first embodiment.

FIGS. 6A and 6B illustrate flows of processing executed in a case where a communication start request is detected while the dual device is operating in the AP mode in a second embodiment.

FIGS. 7A and 7B illustrate flows of processing executed in a case where a communication start request is detected while the dual device is operating in the STA mode in the second embodiment.

FIG. 8 illustrates a flow of operation of the dual device in 507 to 513 and 505 and 506 in FIG. 5A.

DESCRIPTION OF THE EMBODIMENTS

Now, embodiments of the present invention will be described in detail with reference to the drawings. The present invention is not limited to the embodiments described below, and various modifications are possible within the spirit of the present invention.

The following embodiments will be described in the context of IEEE 802.11 wireless LAN communications.

There exist two communication modes for IEEE 802.11 wireless LANs, namely, an infrastructure mode and an adhoc mode.

In the infrastructure mode, a plurality of terminals carries out wireless communications via control stations called access points (APs). Thus, the APs control the terminals to relay communications among the terminals. The terminals operating in the infrastructure mode carry out communications with other terminals via APs.

On the other hand, in the adhoc mode, a plurality of terminals carries out communications directly with each other without APs acting between communication terminals. Thus, the terminals operating in the adhoc mode exchange packets directly with other terminals.

FIG. 1 is a diagram illustrating the network configuration in the following embodiments.

A communication device 1 has a function of carrying out communications over a wireless LAN. The communication device 1 can operate in an AP mode and in an STA (station) mode, and can switch between these two modes. Hereinafter, a communication device having the function of switching between the AP mode and the STA mode (hereinafter referred to as the dual function will be referred to as a dual device.

A communication device 2 has a function of carrying out communications via a wireless LAN, but does not have the dual function. That is, the communication device 2 only has a function as a wireless LAN terminal. Hereinafter, a communication device having only the function as a wireless LAN terminal will be referred to as a non-dual device.

The AP mode is an operation mode in which a communication device operates as an AP. When a dual device operates in the AP mode, communications can be carried out in the infrastructure mode.

The STA mode is an operation mode in which a communication device operates as a wireless LAN terminal. When a dual device operates in the STA mode, communications can be carried out in the infrastructure mode under the control of an AP. Furthermore, a dual device operating in the STA mode can carry out communications directly in the adhoc mode with a non-dual device. In the embodiments described below, it is assumed that a dual device is configured to operate in the adhoc mode when activated in the STA mode. A non-dual device can be considered as a communication device having only the STA mode.

The communication device 1, which is a dual device, and the communication device 2, which is a non-dual device, form a basic service set (BSS) 3.

Figure 20:
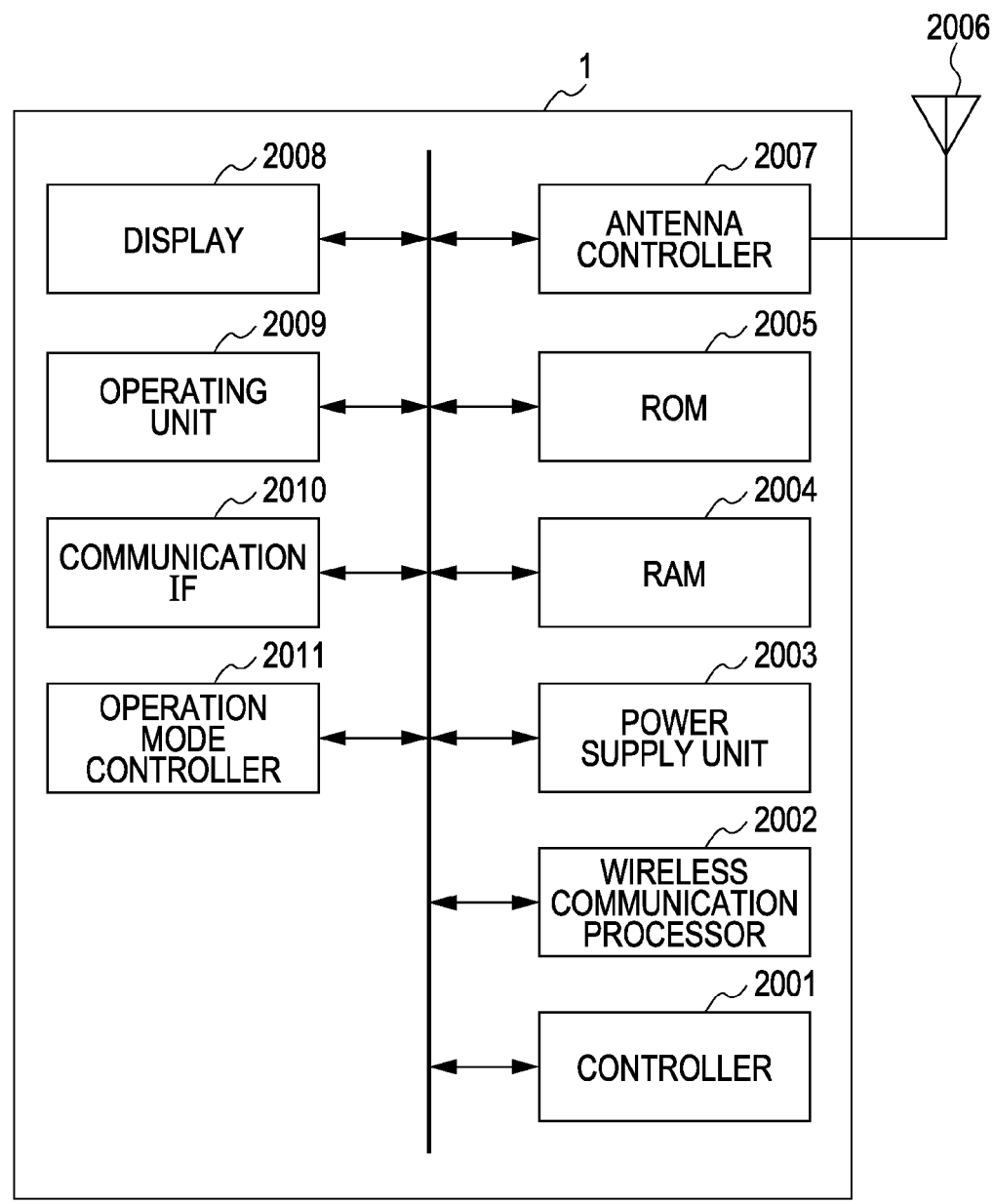
FIG. 20 is a block diagram of the dual device.

FIG. 20 is a block diagram of a dual device (the communication device 1).

The communication device 1 includes a controller 2001 that controls the communication device 1, a wireless communication processor 2002 that controls wireless LAN communications, and a power supply unit 2003.

The communication device 1 also includes a random access memory (RAM) 2004, and a read-only memory (ROM) 2005 storing operation programs for executing various operations as will be described later. The communication device 1 also includes an antenna controller 2007 that is connected to an antenna 2006, a display 2008, and an operating unit 2009. Furthermore, the communication device 1 includes a non-wireless communication interface 2010, such as a USB interface or an IEEE 1394 interface. The communication device 1 further includes an operation mode controller 2011 that controls switching of operation mode.

Figure 21:
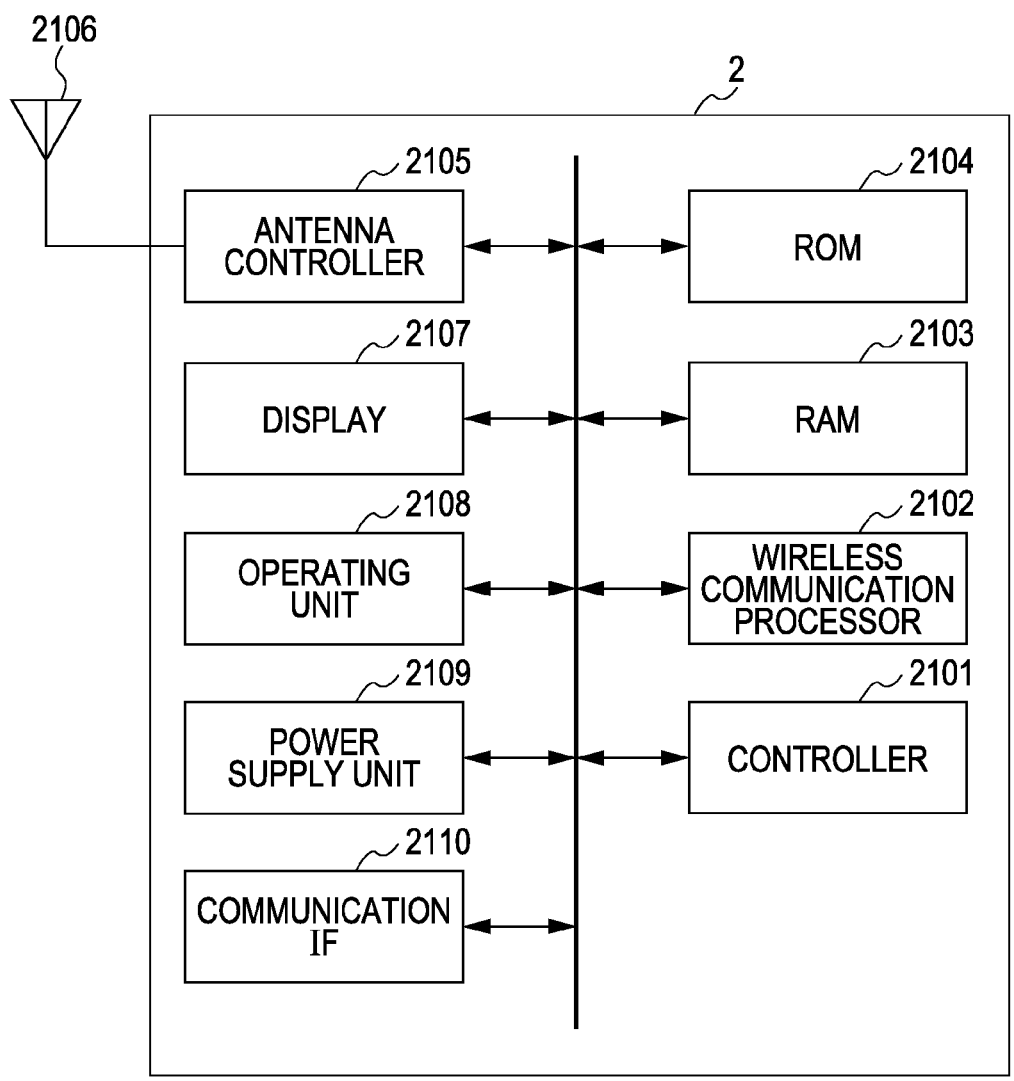
FIG. 21 a block diagram of the non-dual device.

FIG. 21 is a block diagram of a non-dual device (the communication device 2).

The communication device 2 includes a controller 2101 that controls the communication device 2, and a wireless communication processor 2102 that controls wireless LAN communications.

The communication device 2 also includes a RAM 2103, and a ROM 2104 storing operation programs for executing various operations as will be described later.

The communication device 2 also includes an antennal controller 2105 that is connected to an antenna 2106, a display 2107, an operating unit 2108, and a power supply unit 2109. Furthermore, the communication device 2 includes a non-wireless communication interface 2110, such as a USB interface or an IEEE 1394 interface.

Figure 2A:
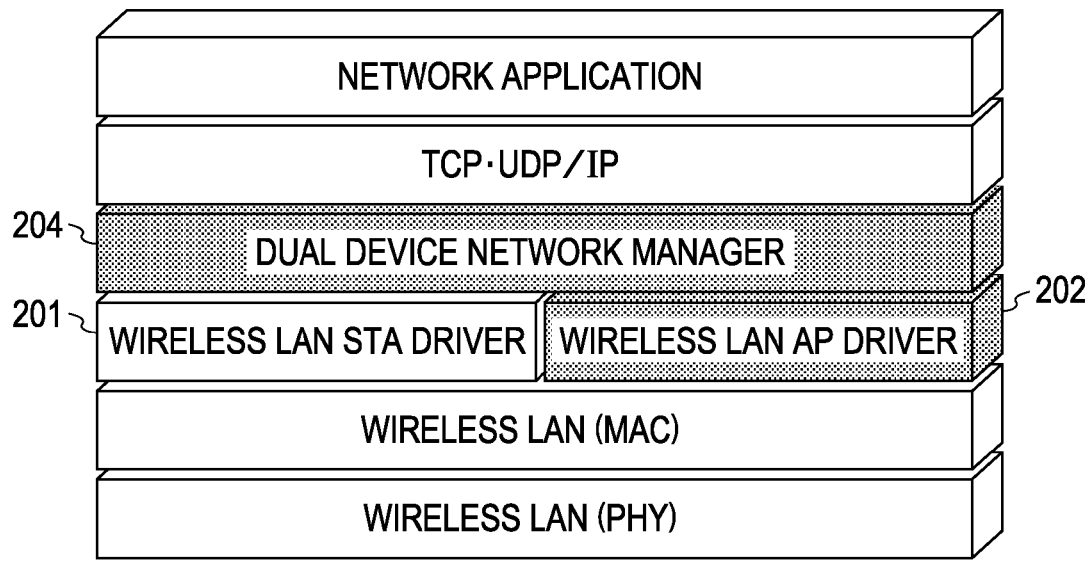
FIGS. 2A and 2B are diagrams illustrating functional layers of a dual device and a non-dual device.
Figure 2B:
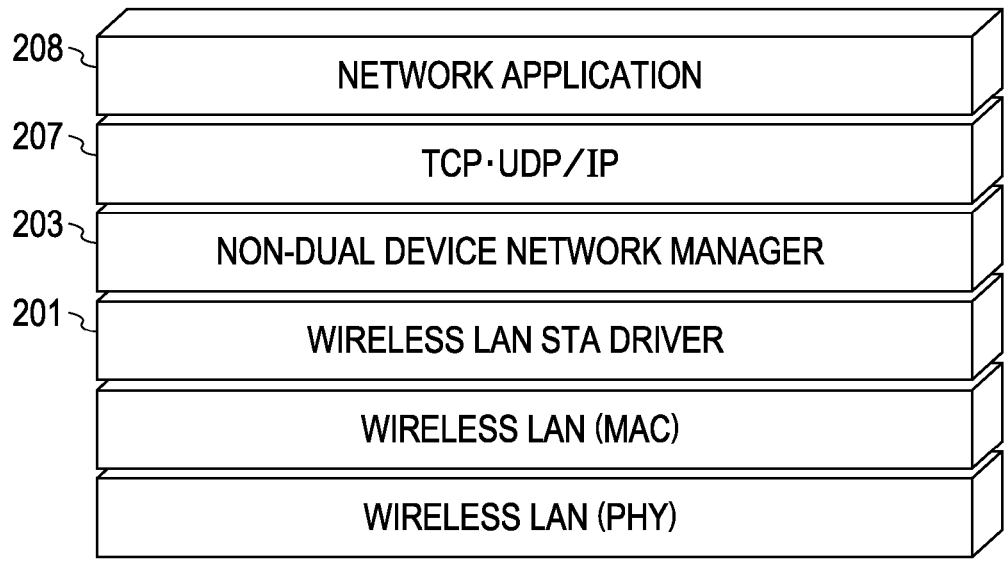

FIGS. 2A and 2B are diagrams illustrating functional layers of the dual device and the non-dual device. Compared with the non-dual device, the dual device additionally has a wireless LAN AP driver function 202 for operation in the AP mode. Furthermore, the dual device can choose to activate or control either a wireless LAN STA driver function 201 or the wireless LAN AP driver function 202. For this purpose, the dual device has a dual device network manager function 204 instead of a non-dual device network manager function 203.

Figure 3:
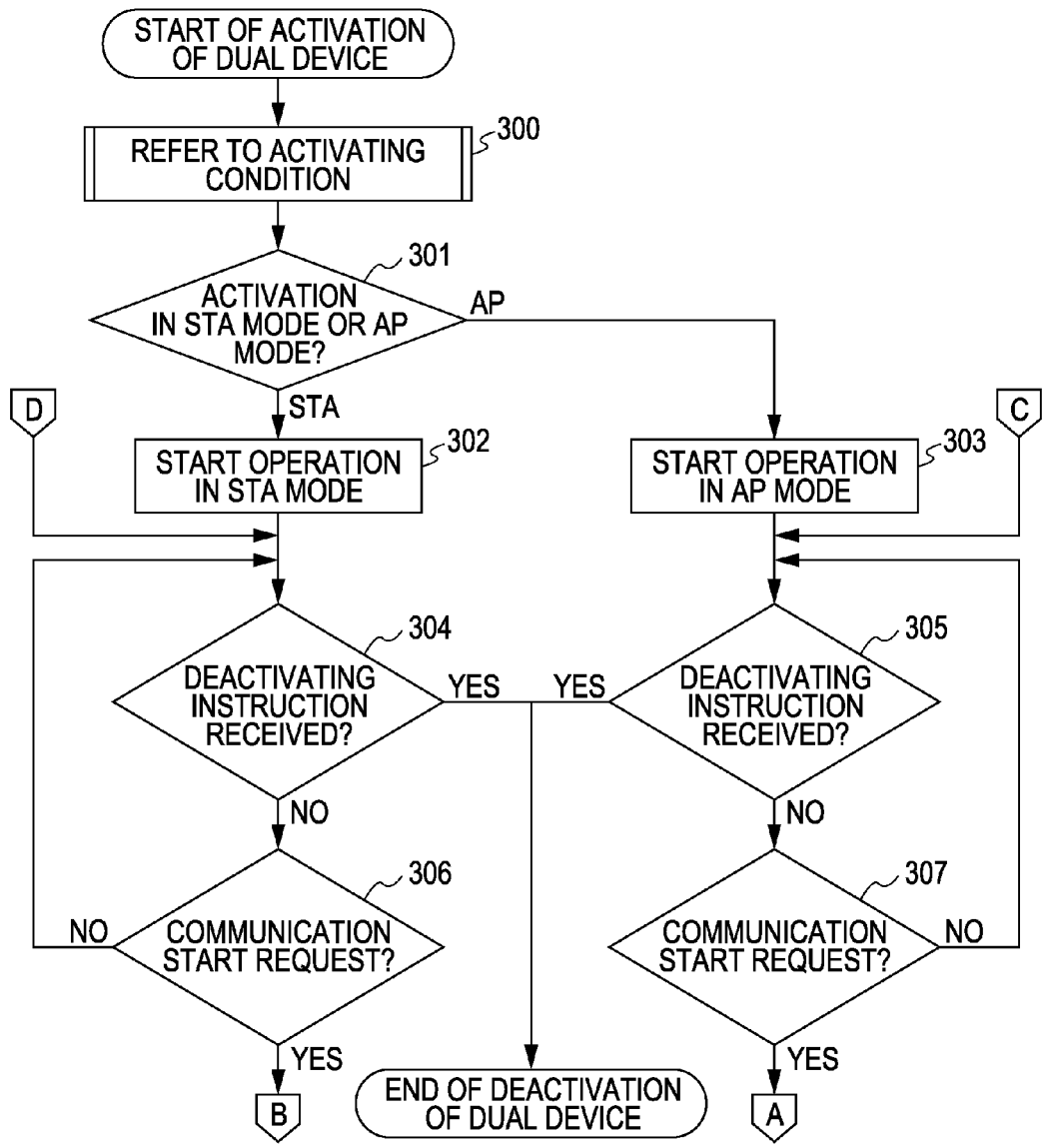
FIG. 3 illustrates a flow of processing executed by the dual device and the non-dual device.

FIGS. 3 to 5 are flowcharts of processing executed by the dual device and the non-dual device according to a first embodiment of the present invention.

At the time of activation, the dual device refers to an activating condition stored in advance in the dual device (300), and is activated either in the STA mode or in the AP mode accordingly (301, 302, 303). In the present embodiment, it is assumed that the dual device is configured to operate in the adhoc mode when activated in the STA mode. Thus, when activated in the STA mode, the dual device gets connected to the non-dual device in the adhoc mode. When activated in the AP mode, the dual device gets connected to the non-dual device in the infrastructure mode.

When a communication start request is issued by the dual device or the non-dual device while the dual device is operating in the STA mode (Yes in 306), the procedure proceeds to point B in FIG. 5A. When a communication start request is issued by the dual device or the non-dual device while the dual device is operating in the AP mode (Yes in 307), the procedure proceeds to point A in FIG. 4A. When a stop instruction is issued (Yes in 304 or 305), the dual device stops the operation.

Now, description will be given with reference to FIGS. 4A and 4B.

When a communication start request is issued while the dual device is operating in the AP mode, the procedure branches according to whether the request is issued by the non-dual device or the dual device (400).

When the request is issued by the non-dual device, if the non-dual device requests communications in the infrastructure mode, communications in the infrastructure mode are started immediately (401, 402). The procedure then proceeds to point C in FIG. 3.

As described above, when the communication mode desired by the non-dual device coincides with the current communication mode, communications can be continued in the current communication mode.

When the request is issued by the non-dual device, if the non-dual device requests communications in the adhoc mode, the procedure branches according to whether the non-dual device supports message communications with the dual device regarding switching of communication mode (403).

The message communications in the present embodiment refer to negotiation between the non-dual device and the dual device regarding switching of communication mode. The non-dual device supporting the message communications is capable of exchanging specific signals used for the negotiation.

In the message communications in the present embodiment, the non-dual device requests the dual device to change its operation mode (AP mode/STA mode), and in response to the request, the dual device issues a response indicating whether the operation mode can be changed. Depending on the situation, the dual device requests the non-dual device to change its communication mode (the infrastructure mode/the adhoc mode), and in response to the request, the non-dual device issues a response indicating whether the operation mode can be changed.

When the non-dual device does not support the message communications with the dual device (No in 403), the dual device maintains the operation in the AP mode (404).

Then, the non-dual device detects a beacon for the infrastructure mode (405), which is transmitted when the dual device is operating in the AP mode, thereby recognizing that the dual device is maintaining the AP mode. Then, when the non-dual device starts communications, the non-dual device starts communications in the infrastructure mode, not the adhoc mode (406). Thus, the procedure proceeds to point C in FIG. 3.

As described above, even when the non-dual device desires communications in a communication mode different from the current communication mode, if the non-dual device does not support the message communications, communications are carried out in the current communication mode. Since communications can be carried out in an available communication mode when communications in a desired communication mode are not allowed, it is possible to avoid situations where communications are prohibited.

When the non-dual device supports the message communications with the dual device (Yes in 403), the non-dual device connects a session for the message communications with the dual device (407).

When the session has been established, the non-dual device starts the message communications with the dual device. First, the non-dual device requests the dual device to operate in the STA mode (408).

Upon receiving the request for operation in the STA mode, the dual device determines whether to accept the switching of operation mode on the basis of the current communication status and the like, and returns a result to the non-dual device (409).

After returning the result, the dual device disconnects the session for the message communications (410). When it is determined that the operation mode can be switched to the STA mode (Yes in 411), the dual device switches the operation mode to the STA mode (412). Then, the dual device carries out communications with the non-dual device in the adhoc mode (413). Thus, the procedure proceeds to point D in FIG. 3.

When it is determined that the switching to the STA mode is not allowed (No in 411), the dual device maintains the operation in the AP mode, and carries out communications with the non-dual device in the infrastructure mode (405, 406).

Figure 12:
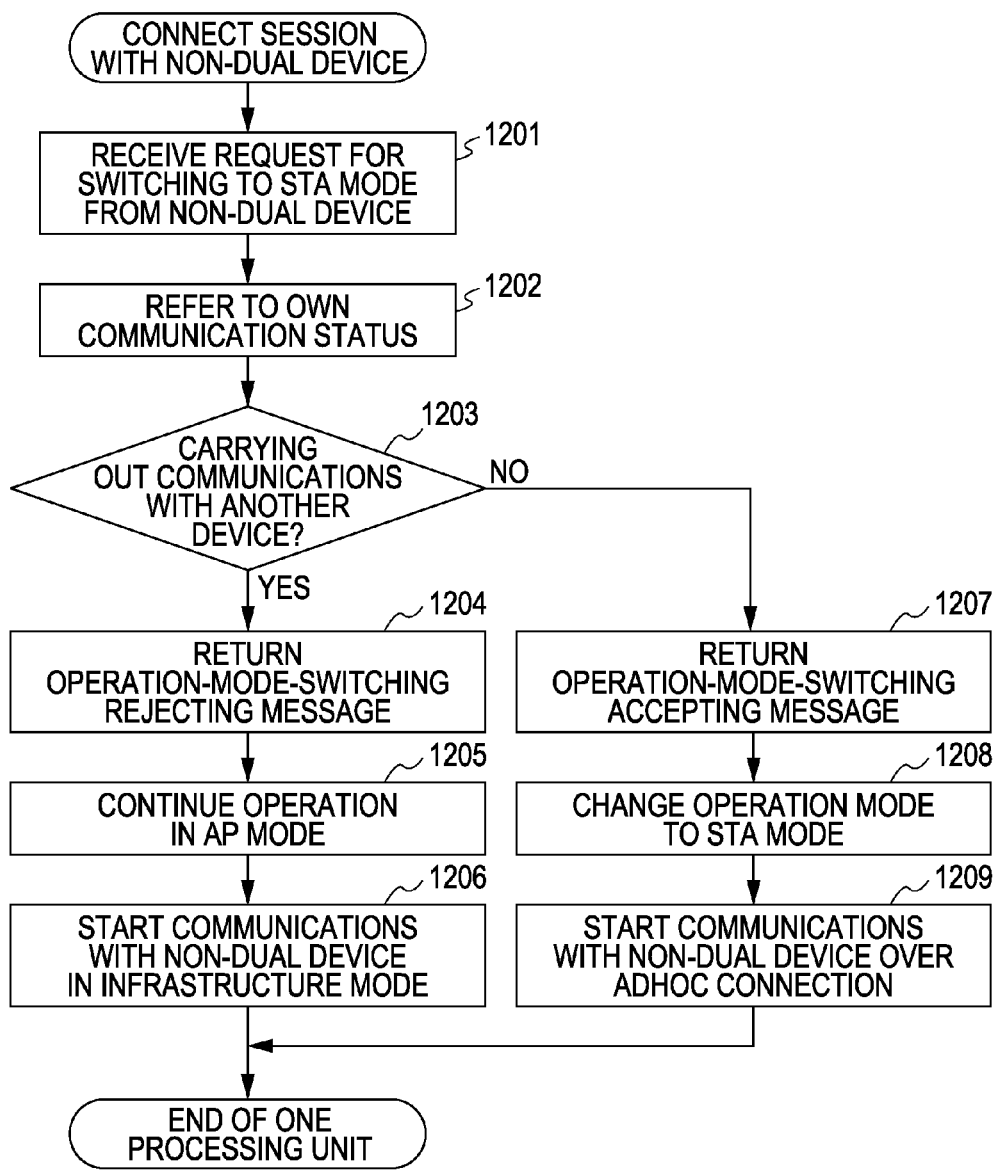
FIG. 12 is a flow of operation of the dual device in 407 to 413 and 405 and 406 in FIG. 4A.
Figure 13:
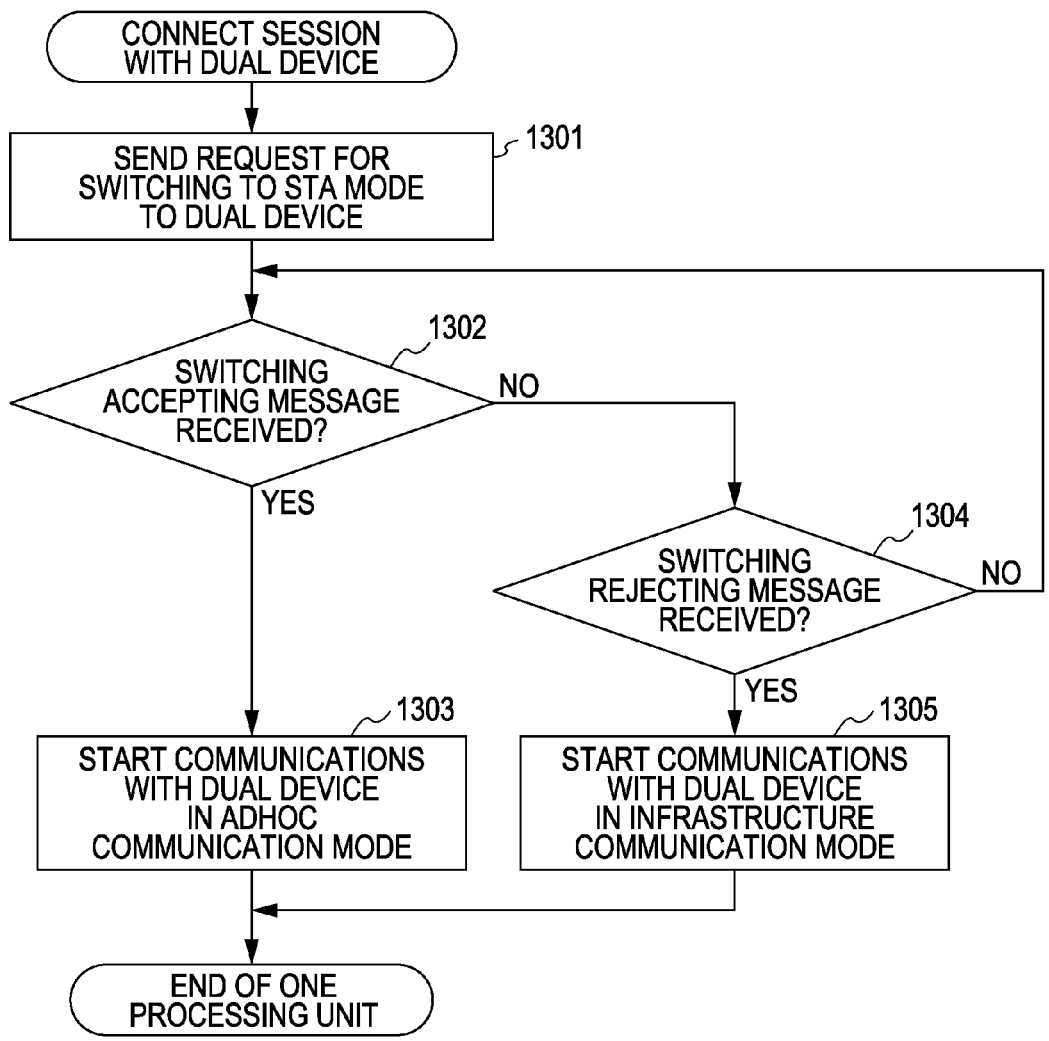
FIG. 13 is a flow of operation of the non-dual device in 407 to 413 and 405 and 406 in FIG. 4A.

FIG. 12 illustrates a flow of operation of the dual device and FIG. 13 illustrates a flow of operation of the non-dual device in 407 to 413 and 405 and 406 in FIG. 4A.

First, after a session is connected between the non-dual device and the dual device, the non-dual device requests the dual device to switch to the STA mode (1301). Upon receiving the request for switching to the STA mode (1201), the dual device refers to its own current communication status (1202).

When the dual device is already carrying out communications with another device in the AP mode (the infrastructure mode) (Yes in 1203), the dual device returns a message indicating rejection of switching to the STA mode to the non-dual device (1204), and continues the operation in the AP mode (1205). Then, the dual device starts communications with the non-dual device in the infrastructure mode (1206).

When the dual device is not carrying out communications with another device (No in 1203), the dual device returns a message indicating acceptance of switching to the STA mode to the non-dual device (1207), and switches its operation mode to the STA mode (1208). Then, the dual device starts communications with the non-dual device in the adhoc mode (1209).

When an operation-mode-switching accepting message is received (Yes in 1302), the non-dual device starts communications with the dual device in the adhoc mode (1303). When an operation-mode-switching rejecting message is received (No in 1302, Yes in 1304), the non-dual device starts communications with the dual device in the infrastructure mode (1305).

As described above, when the non-dual device desires communications in a communication mode different from the current communication mode and the non-dual device supports the message communications, it is determined whether to switch to the desired communication mode on the basis of the current communication status of the dual device. Thus, it is possible to avoid situations where communications that have been going on are suddenly interrupted by switching of communication mode, while allowing communications in a desired communication mode when possible.

Now, description will be given referring back to FIGS. 4A and 4B (400).

When the communication start request is issued by the dual device, the procedure branches according to whether the requested communication mode is the infrastructure mode or the adhoc mode (414).

When the communication mode requested by the dual device is the infrastructure mode, the dual device starts communications with the non-dual device in the infrastructure mode (414, 415).

As described above, when the communication mode desired by the dual device coincides with the current communication mode, communications can be continued in the current communication mode.

When the communication mode requested by the dual device is the adhoc mode, the procedure branches according to whether the non-dual device supports the message communications with the dual device regarding switching of communication mode (416). In order to determine whether the message communications are supported, for example, the dual device sends a signal for checking whether the message communications are supported to the non-dual device, and checks whether a response to the signal is received.

When the non-dual device does not support the message communications with the dual device (No in 416), the dual device maintains the operation in the AP mode (417).

Then, the non-dual device detects a beacon for the infrastructure mode (418), which is transmitted when the dual device is operating in the AP mode, thereby recognizing that the dual device is maintaining the AP mode. Then, when the non-dual device starts communications, the non-dual device starts communications in the infrastructure mode, not the adhoc mode (419). Thus, the procedure proceeds to point C in FIG. 3.

As described above, even when the dual device desires communications in a communication mode different from the current communication mode, if the non-dual device does not support the message communications, communications are carried out in the current communication mode. Since communications can be carried out in an available communication mode when communications in a desired communication mode are not allowed, it is possible to avoid situations where communications are prohibited.

When the non-dual device supports the message communications with the dual device (Yes in 416), the dual device connects a session for the message communications with the non-dual device (420).

When the session has been established, the dual device starts the message communications with the non-dual device. First, the dual device requests the non-dual device to carry out communications in the adhoc mode (421).

When a request for carrying out communications in the adhoc mode is received, the non-dual device determines whether to accept the switching of communication mode on the basis of the current communication status and the like, and returns a result to the dual device (422).

Upon receiving the returned result, the dual device disconnects the session for the message communications (423). When a message indicating acceptance of switching to the adhoc mode is returned from the non-dual device (Yes in 424), the dual device changes the communication mode to the STA mode (425). Then, the dual device carries out communications with the non-dual device in the adhoc mode (426). Thus, the procedure proceeds to point D in FIG. 3.

When a message indicating rejection of switching to the adhoc mode is returned from the non-dual device (No in 424), the dual device maintains the operation in the AP mode, and carries out communications with the non-dual device in the infrastructure mode (418, 419).

Figure 14:
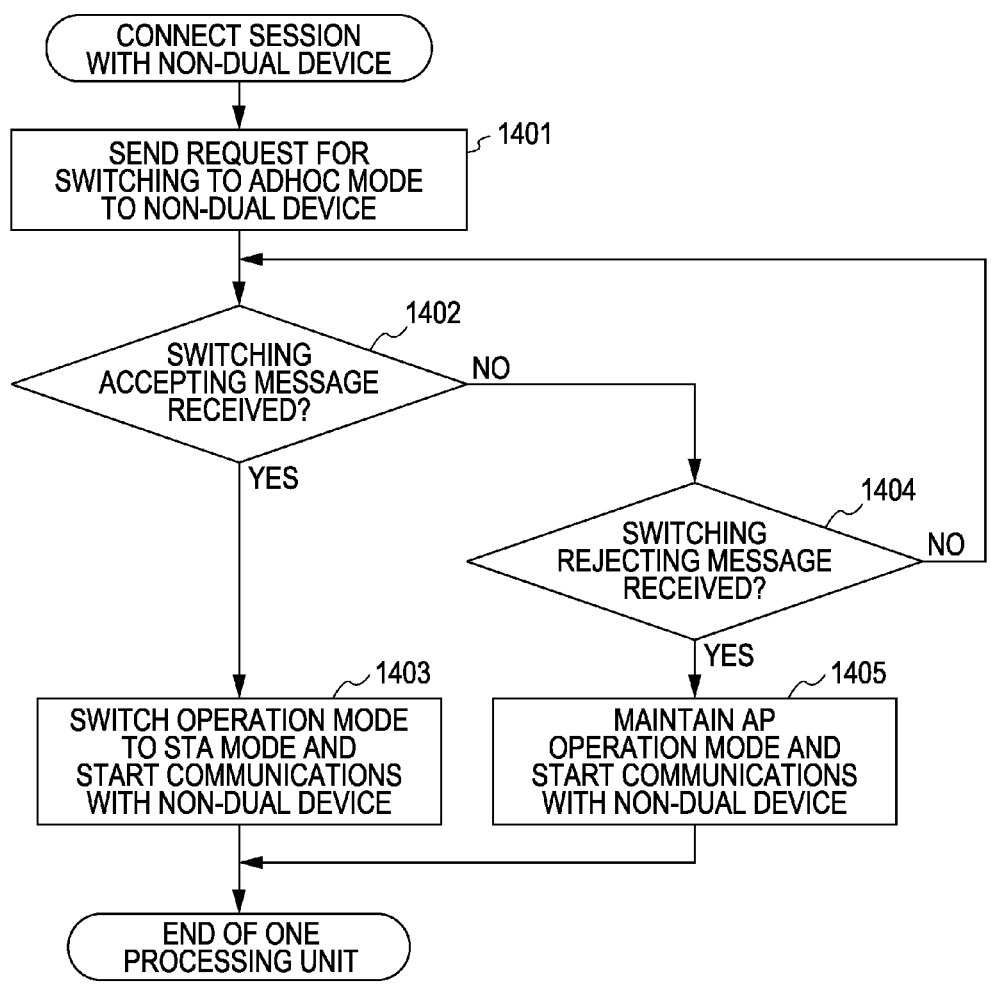
FIG. 14 is a flow of operation of the dual device in 420 to 426 and 418 and 419 in FIG. 4B.
Figure 15:
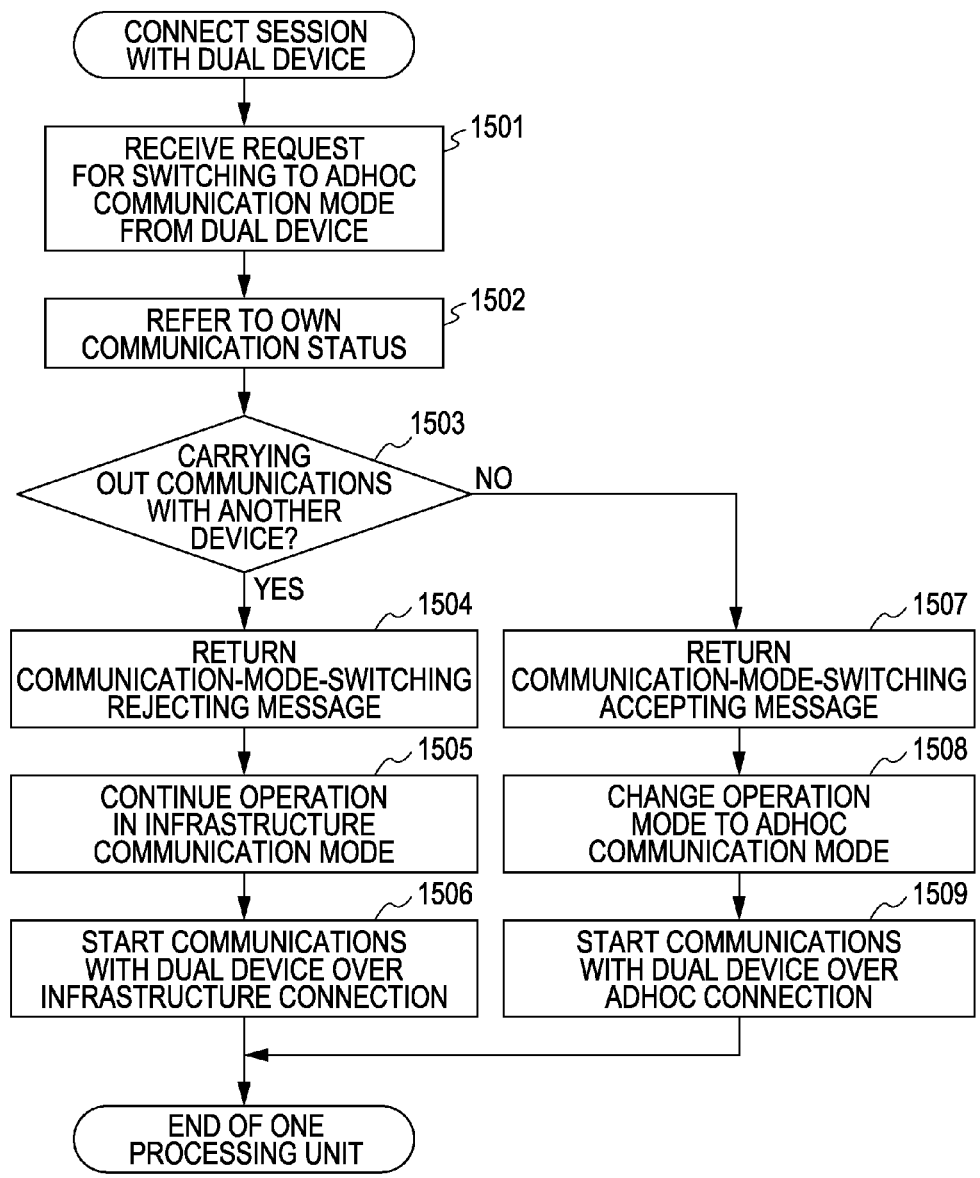
FIG. 15 is a flow of operation of the non-dual device in 420 to 426 and 418 and 419 in FIG. 4B.

FIG. 14 illustrates a flow of operation of the dual device and FIG. 15 illustrates a flow of operation of the non-dual device in 420 to 426 and 418 and 419 in FIG. 4B.

First, after a session is connected between the non-dual device and the dual device, the dual device sends a request for switching to the adhoc mode to the non-dual device (1401).

Upon receiving the request for switching to the adhoc mode (1501), the non-dual device refers to its own current communication status (1502).

When the non-dual device is already carrying out communications with another device in the infrastructure mode (Yes in 1503), the non-dual device returns a message indicating rejection of switching to the adhoc mode to the dual device (1504), and continues the operation in the infrastructure mode (1505). Then, the non-dual device starts communications with the dual device in the infrastructure mode (1506).

When the non-dual device is not carrying out communications with another device, the non-dual device returns a message indicating acceptance of switching to the adhoc mode to the dual device (1507), and switches the communication mode to the adhoc mode (1508). Then, the non-dual device starts communications with the dual device in the adhoc mode (1509).

When a communication-mode-switching accepting message is received (Yes in 1402), the dual device switches the communication mode to the STA mode (1403). Then, the dual device starts communications with the non-dual device in the adhoc mode (1403).

When a communication-mode-switching rejecting message is received (No in 1402, Yes in 1404), the dual device continues the operation in the AP mode, and starts communications with the non-dual device in the infrastructure mode (1405).

As described above, when the dual device desires communications in a communication mode different from the current communication mode and the non-dual device supports the message communications, it is determined whether to switch to the desired communication mode on the basis of the current communication status of the non-dual device. Thus, it is possible to avoid situations where communications that have been going on are suddenly interrupted by switching of communication mode, while allowing communications in a desired communication mode when possible.

Figure 5B:
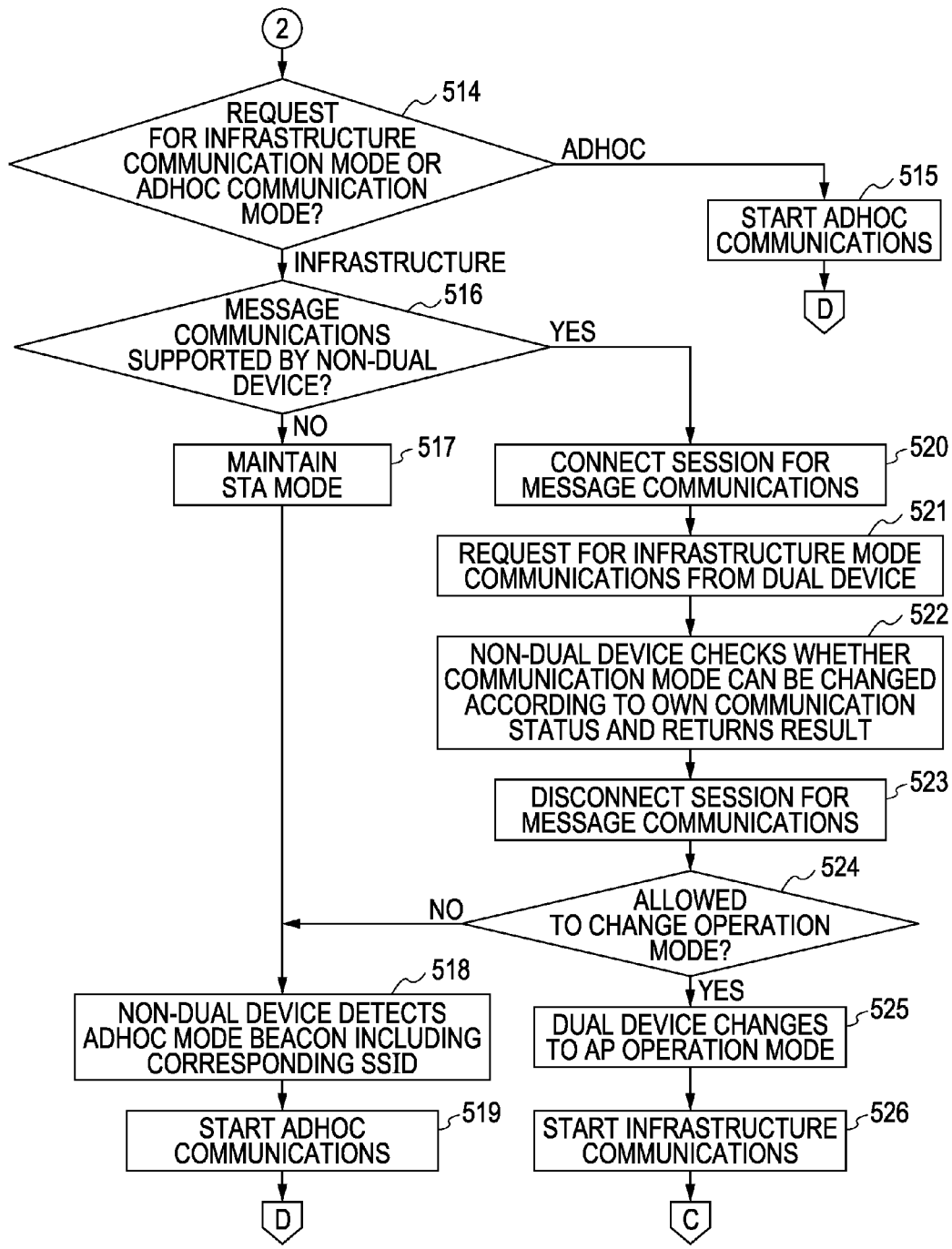

Next, description will be given with reference to FIGS. 5A and 5B. FIGS. 5A and 5B illustrate a flow of operation in a case where a communication start request is detected while the dual device is operating in the STA mode.

When a communication start request is detected while the dual device is operating in the STA mode, the procedure branches according to whether the request is issued by the non-dual device or the dual device (500).

When the request is issued by the non-dual device, if the communication mode requested by the non-dual device is the adhoc mode, communications are started immediately in the adhoc mode (501, 502). Then, the procedure proceeds to point D in FIG. 3.

As described above, when the communication mode desired by the non-dual device coincides with the current communication mode, communications can be continued in the current communication mode.

When the request is issued by the non-dual device, if the communication mode requested by the non-dual device is the infrastructure mode, the procedure branches according to whether the non-dual device supports the message communications with the dual device regarding switching of communication mode (503).

When the non-dual device does not support the message communications with the dual device (No in 503), the dual device maintains the operation in the STA mode (504). Then, the non-dual device detects a beacon for the adhoc mode (505), which is transmitted when the dual device is operating in the STA mode, thereby recognizing that the dual device is maintaining the STA mode. Then, when the non-dual device starts communications, the non-dual device starts communications in the adhoc mode, not the infrastructure mode (506). Thus, the procedure proceeds to point D in FIG. 3.

As described above, even when the non-dual device desires communications in a communication mode different from the current communication mode, if the non-dual device does not support the message communications, communications are carried out in the current communication mode. Since communications can be carried out in an available communication mode when communications in a desired communication mode are not allowed, it is possible to avoid situations where communications are prohibited.

When the non-dual device supports the message communications with the dual device (Yes in 503), the non-dual device connects a session for the message communications with the dual device (507).

When the session has been established, the non-dual device starts the message communications with the dual device. First, the non-dual device requests the dual device to operate in the AP mode (508).

Upon receiving the request for operating in the AP mode, the dual device determines whether to accept the switching of the operation mode on the basis of the current communication status and the like, and returns a result to the non-dual device (509).

Upon returning the result, the dual device disconnects the session for the message communications (510). When it is determined that the operation mode can be changed to the AP mode (Yes in 511), the dual device changes the operation mode to the AP mode (512). Then, the dual device carries out communications with the dual device in the infrastructure mode (513). Thus, the procedure proceeds to point C in FIG. 3.

When it is not allowed to switch to the AP mode (No in 511), the dual device maintains the operation in the STA mode, and carries out communications with the non-dual device in the adhoc mode (505, 506).

Figure 9:
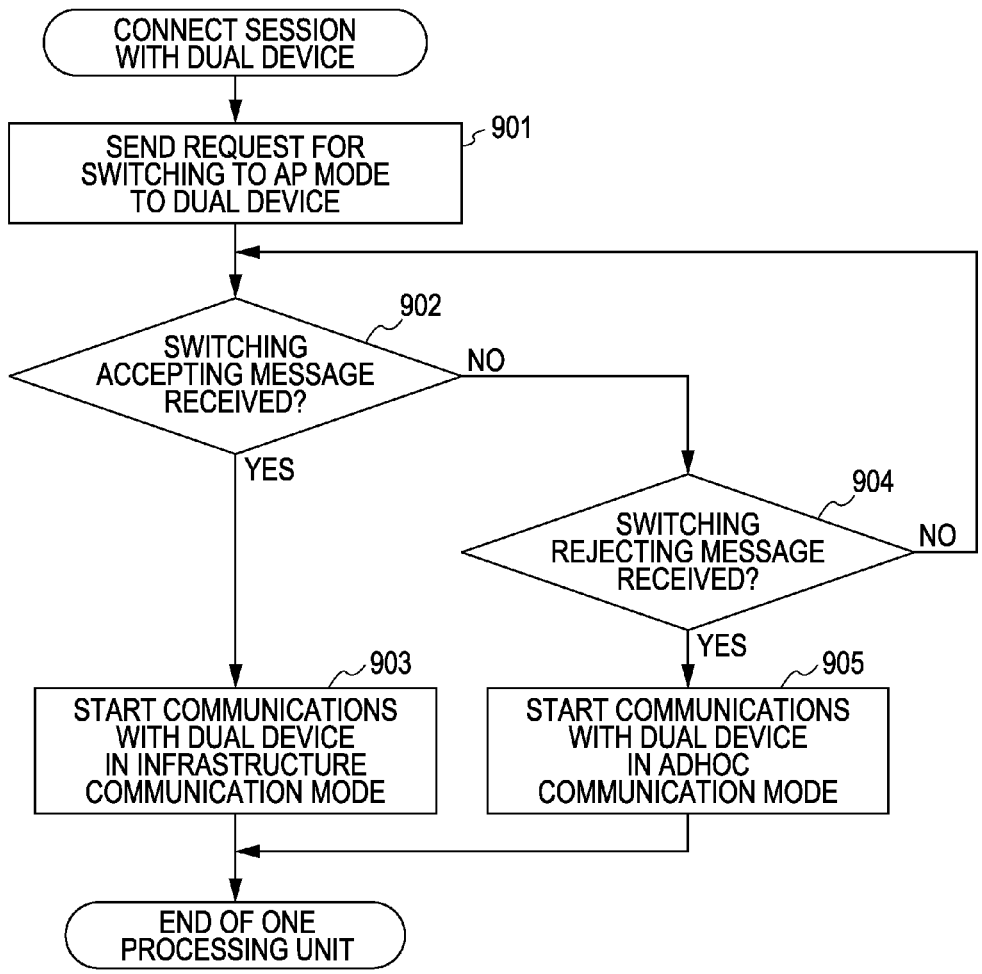
FIG. 9 illustrates a flow of operation of the non-dual device in 507 to 513 and 505 and 506 in FIG. 5A.

FIG. 8 illustrates a flow of operation of the dual device and FIG. 9 illustrates a flow of operation of the non-dual device in 507 to 513 and 505 and 506 in FIG. 5A.

First, after a session is connected between the non-dual device and the dual device, the non-dual device sends a request for switching to the AP mode to the dual device (901). Upon receiving the request for switching to the AP mode (801), the dual device refers to its own current communication status (802).

When the dual device is already carrying out communications with another device in the STA mode (the adhoc mode) (Yes in 803), the dual device returns a message indicating rejection of switching to the AP mode to the non-dual device (804), and continues the operation in the STA mode (805). Then, the dual device starts communications with the non-dual device in the adhoc mode (806).

When the dual device is not carrying out communications with another device (No in 803), the dual device returns a message indicating acceptance of switching to the AP mode to the non-dual device (807), and switches to the AP mode (808). Then, the dual device starts communications with the non-dual device in the infrastructure mode (1209).

When an operation-mode-switching accepting message is received (Yes in 902), the non-dual device starts communications with the dual device in the infrastructure mode (903). When an operation-mode-switching rejecting message is received (No in 902, Yes in 904), the non-dual device starts communications with the dual device in the adhoc mode (905).

As described above, when the non-dual device desires communications in a communication mode different from the current communication mode and the non-dual device supports the message communications, it is determined whether to switch to the desired communication mode on the basis of the current communication status of the dual device. Thus, it is possible to avoid situations where communications that have been going on are suddenly interrupted by switching of communication mode, while allowing communications in a desired communication mode when possible.

Now, description will be given referring back to FIGS. 5A and 5B (500).

Also when the communication start request is issued by the dual device, the procedure branches according to whether the requested communication mode is the infrastructure mode or the adhoc mode (514).

When the communication mode requested by the dual device is the adhoc mode, the dual device starts communications with the non-dual device in the adhoc mode (514, 515). Then, the procedure proceeds to point D in FIG. 3.

As described above, when the communication mode desired by the dual device coincides with the current communication mode, communications can be continued in the current communication mode.

When the communication mode requested by the dual device is the infrastructure mode, the procedure branches according to whether the non-dual device supports the message communications with the dual device regarding switching of communication mode (516). In order to find out whether the message communications are supported, for example, the dual device sends a signal for checking whether the message communications are supported to the non-dual device, and checks whether a response to the signal is received.

When the non-dual device does not support the message communications with the dual device (No in 516), the dual device maintains the operation in the STA mode (517).

Then, the non-dual device detects a beacon for the adhoc mode (518), which is transmitted when the dual device is operating in the STA mode, thereby recognizing that the dual device is maintaining the STA mode. Then, when the non-dual device starts communications with the non-dual device, the non-dual device starts communications in the adhoc mode, not the infrastructure mode (519). Thus, the procedure proceeds to point D in FIG. 3.

As described above, even when the dual device desires communications in a communication mode different from the current communication mode, if the non-dual device does not support the message communications, communications are carried out in the current communication mode. Since communications can be carried out in an available communication mode when communications in a desired communication mode are not allowed, it is possible to avoid situations where communications are prohibited.

When the non-dual device supports the message communications with the dual device (Yes in 516), the dual device connects a session for the message communications with the non-dual device (520).

When the session has been established, the dual device starts the message communications with the non-dual device.

First, the dual device requests the non-dual device to carry out communications in the infrastructure mode (521).

Upon receiving the request for carrying out communications in the infrastructure mode, the non-dual device determines whether to accept the switching of communication mode on the basis of the current communication status and the like, and returns a result to the dual device (522).

Upon receiving the result, the dual device disconnects the session for the message communications (523). When message indicating acceptance of switching to the infrastructure mode is returned from the non-dual device (Yes in 524), the dual device changes the communication mode to the AP mode (525). Then, the dual device carries out communications with the non-dual device in the infrastructure mode (526). Thus, the procedure proceeds to point C in FIG. 3.

When a message indicating rejection of switching to the infrastructure mode is returned from the non-dual device (No in 524), the dual device maintains the operation in the STA mode, and carries out communications with the non-dual device in the adhoc mode (518, 519).

Figure 10:
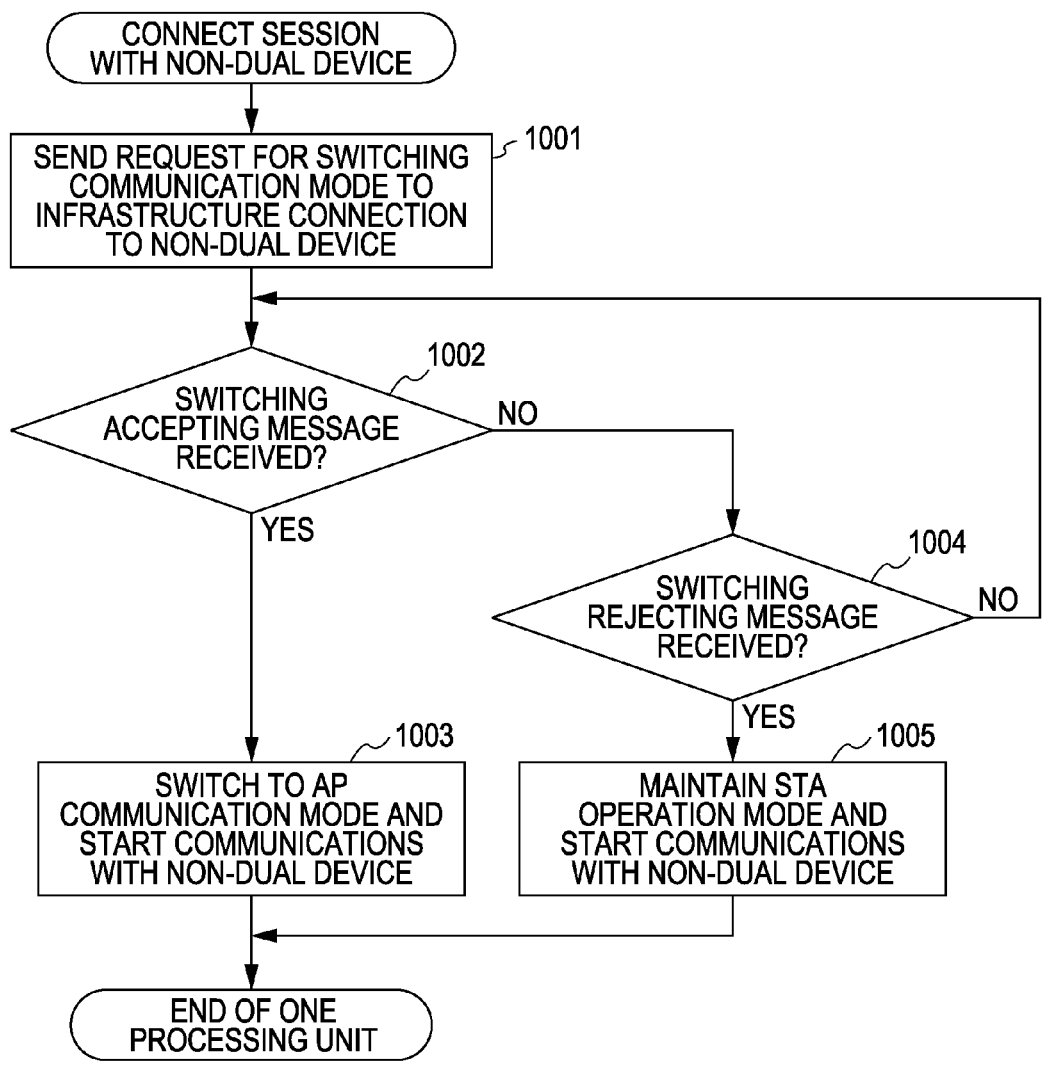
FIG. 10 illustrates a flow of operation of the dual device in 520 to 526 and 518 and 519 in FIG. 5B.
Figure 11:
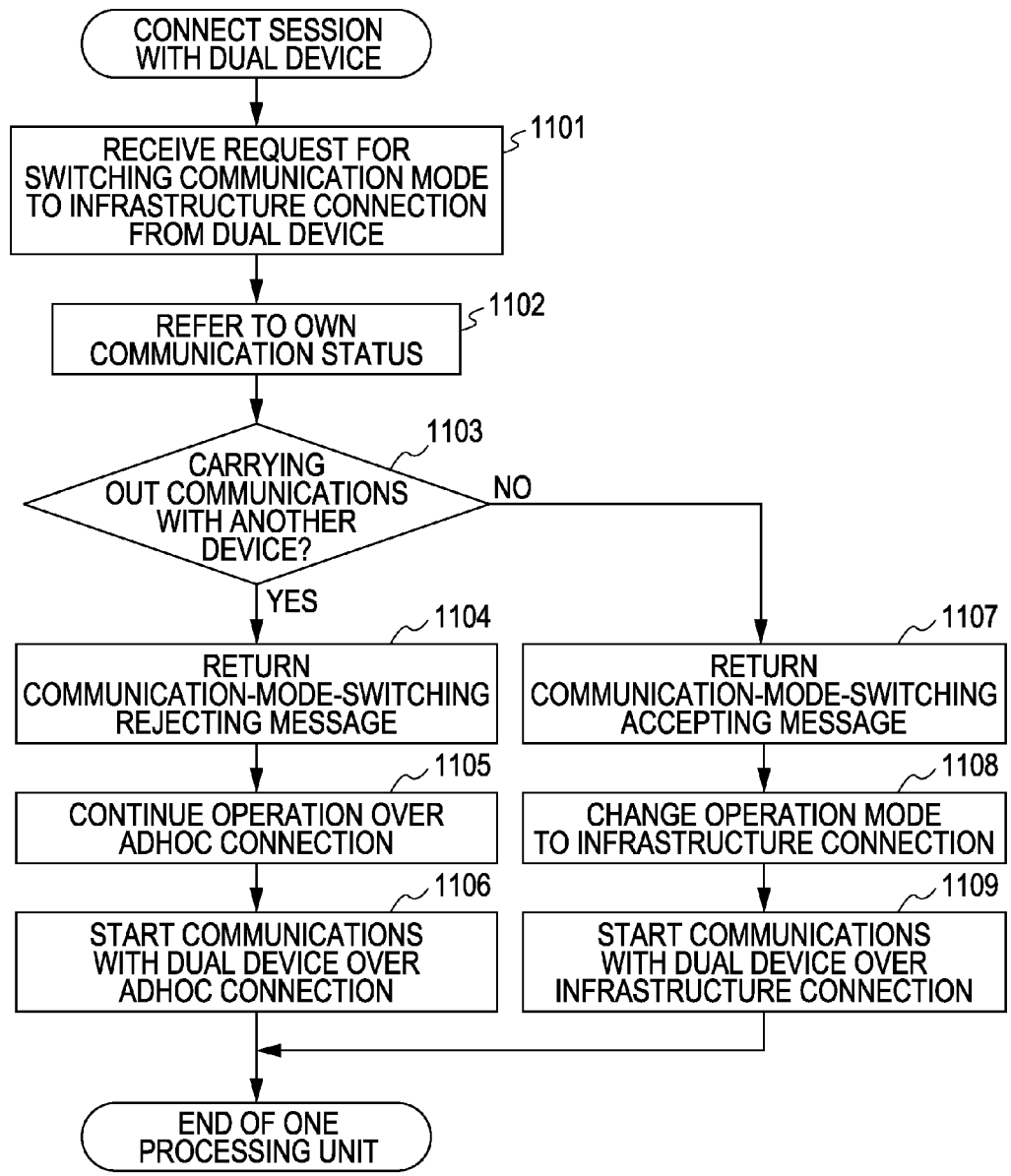
FIG. 11 illustrates a flow of operation of the non-dual device in 520 to 526 and 518 and 519 in FIG. 5B.

FIG. 10 illustrates a flow of operation of the dual device and FIG. 11 illustrates a flow of operation of the non-dual device in 520 to 526 and 518 and 519 in FIG. 5B.

First, after a session is connected between the non-dual device and the dual device, the dual device sends a request for switching to the infrastructure mode to the non-dual device (1001).

Upon receiving the request for switching to the infrastructure mode (1101), the non-dual device refers to its own current communication status (1102).

When the non-dual device is already carrying out communications with another device in the adhoc mode (Yes in 1103), the non-dual device returns a message indicating rejection of switching to the infrastructure mode to the dual device (1104), and continues the operation in the adhoc mode (1105). Then, the non-dual device starts communications with the dual device in the adhoc mode (1106).

When the non-dual device is not carrying out communications with another device, the non-dual device returns a message indicating acceptance of switching to the infrastructure mode to the dual device (1107), and switches to the infrastructure mode (1108). Then, the non-dual device starts communications with the dual device in the infrastructure mode (1109).

When a communication-mode-switching accepting message is received (Yes in 1002), the dual device switches the communication mode to the AP mode, and starts communications with the non-dual device in the infrastructure mode (1003).

When a communication-mode-switching rejecting message is received (No in 1002, Yes in 1004), the dual device maintains the operation in the STA mode, and starts communications with the non-dual device in the adhoc mode (1005).

As described above, when the dual device desires communications in a communication mode different from the current communication mode and the non-dual device supports the message communications, it is determined whether to switch to the desired communication mode on the basis of the current communication status of the non-dual device. Thus, it is possible to avoid situations where communications that have been going on are suddenly interrupted by switching of communication mode, while allowing communications in a desired communication mode when possible.

As described above, according to the present embodiment, even when the dual device gets connected to the non-dual device in a communication mode corresponding to an operation mode in which the non-dual device is activated, the communication mode can be switched. The switching is executed only when the non-dual device supports the message communications, i.e., when it is recognized that the non-dual device is capable of switching the communication mode. Thus, it is possible to avoid situations where communications with the non-dual device are interrupted by unilateral switching of operation mode and communication mode by the dual device. Furthermore, even when the non-dual device is capable of recognizing switching of communication mode, switching is refrained while either the dual device or the non-dual device is carrying out communications with another device. Thus, it is possible to switch communication mode in consideration of the communication status of the system as a whole.

In a second embodiment of the present invention, at the time of switching of communication mode, negotiation is carried out between the non-dual device and the dual device using a device probing message sequence (probe request/probe response) according to the IEEE 802.11.

FIG. 3, FIGS. 6A and 6B, and FIGS. 7A and 7B illustrate flows of processing executed by the dual device and the non-dual device in the present embodiment. When the dual device is activated, the dual device refers to an activating condition stored in advance in the dual device (300), and is activated in either the STA mode or the AP mode accordingly (301, 302, 303).

In the present embodiment, it is assumed that the dual device is configured to start operating in the adhoc mode when activated in the STA mode. Thus, when activated in the STA mode, the dual device gets connected to the non-dual device in the adhoc mode. When activated in the AP mode, the dual device gets connected to the non-dual device in the infrastructure mode.

When a communication request is issued by the dual device or the non-dual device while the dual device is operating in the STA mode (Yes in 306), the procedure proceeds to point B in FIG. 5A. When a communication request is issued by the dual device or the non-dual device while the dual device is operating in the AP mode (Yes in 307), the procedure proceeds to point A in FIG. 4A. When a stop instruction is received (Yes in 304, Yes in 305), the dual device stops the operation.

Now, description will be given with reference to FIGS. 6A and 6B.

When a communication start request is received while the dual device is operating in the AP mode, the procedure branches according to whether the request is issued by the non-dual device or the dual device (600).

When the request is issued by the non-dual device, when the communication mode requested by the non-dual device is the infrastructure mode, communications are started immediately in the infrastructure mode between the dual device and the non-dual device (601, 602). Then, the procedure proceeds to point C in FIG. 3.

When the request is issued by the non-dual device, when the communication mode requested by the non-dual device is the adhoc mode, the procedure branches according to whether the non-dual device supports message communications with the dual device regarding switching of communication mode (603).

The message communications herein refer to negotiation between the non-dual device and the dual device regarding switching of communication mode, executed using a device probing message sequence (probe request/probe response) according to the IEEE 802.11.

When the non-dual device does not support the message communications with the dual device (No in 603), the dual device maintains the operation in the AP mode (604).

Then, the non-dual device detects a beacon for the infrastructure mode (605), which is transmitted when the dual device is operating in the AP mode, thereby recognizing that the dual device is maintaining the AP mode. Then, when the non-dual device starts communications, the non-dual device starts communications in the infrastructure mode, not the adhoc mode (606). Thus, the procedure proceeds to point C in FIG. 3.

When the non-dual device supports the message communications with the dual device (Yes in 603), the non-dual device sends a probe request specifying an SSID that is currently being used for communications in the infrastructure mode (607).

Upon receiving the probe request, the dual device sends a probe response including an SSID for operation in the AP mode to the non-dual device (608).

Then, the non-dual device sends a probe request not specifying an SSID (609). Upon receiving the probe request (not specifying an SSID), the dual device determines whether the operation mode can be changed to the STA mode on the basis of the current communication mode and the like (610).

When it is determined that the operation mode can be changed to the STA mode (Yes in 611), the dual device switches the operation mode to the STA mode (612), and starts communications with the non-dual device in the adhoc mode (613). Then, the procedure proceeds to point D in FIG. 3.

When it is not allowed to change the operation mode to the STA mode (No in 611), the dual device maintains the operation in the AP mode, and starts communications with the non-dual device in the infrastructure mode (605, 606).

Figure 18:
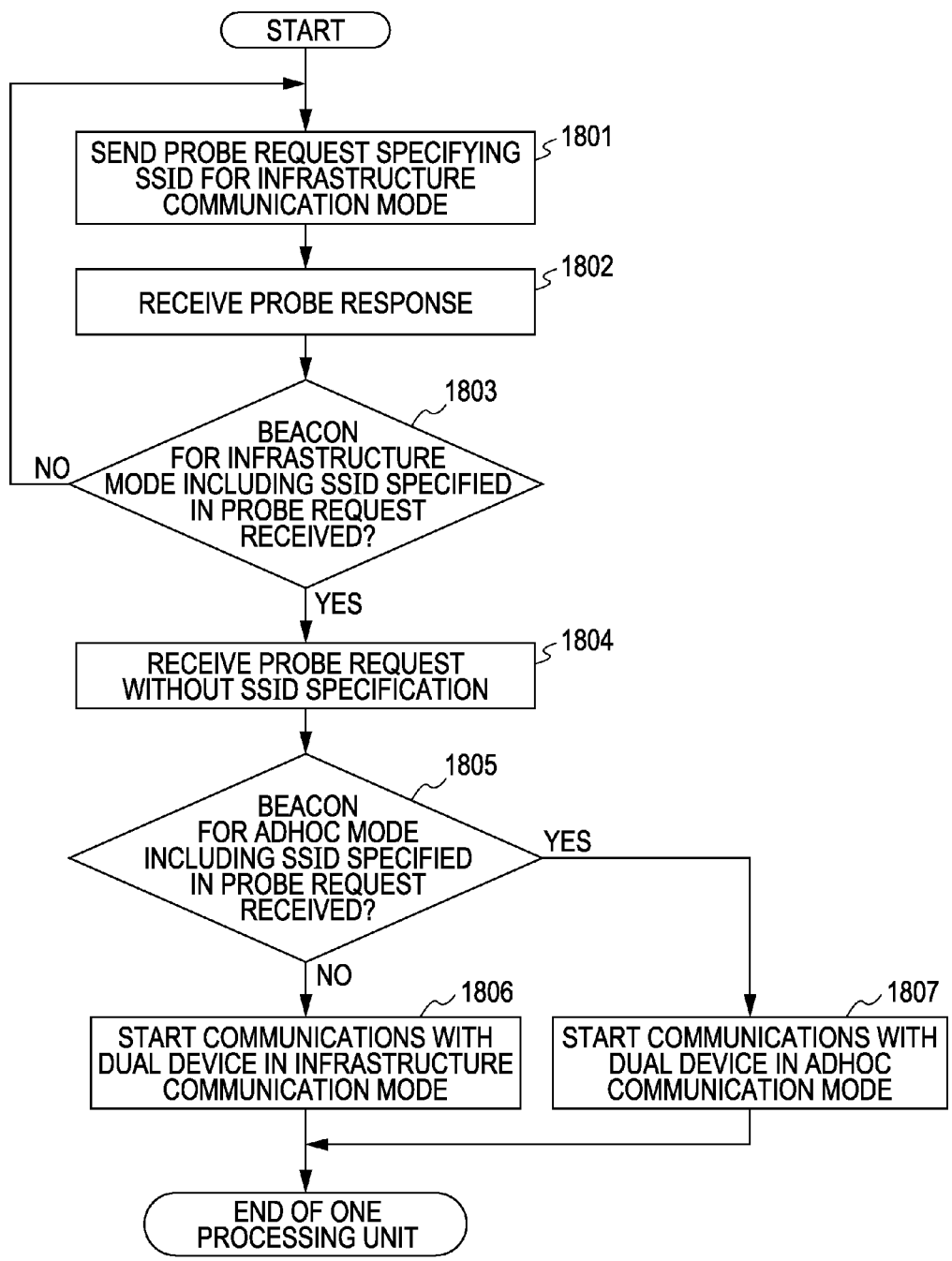
FIG. 18 is a flow of operation of the non-dual device in 607 to 613 and 605 and 606 in FIG. 6A.
Figure 19:
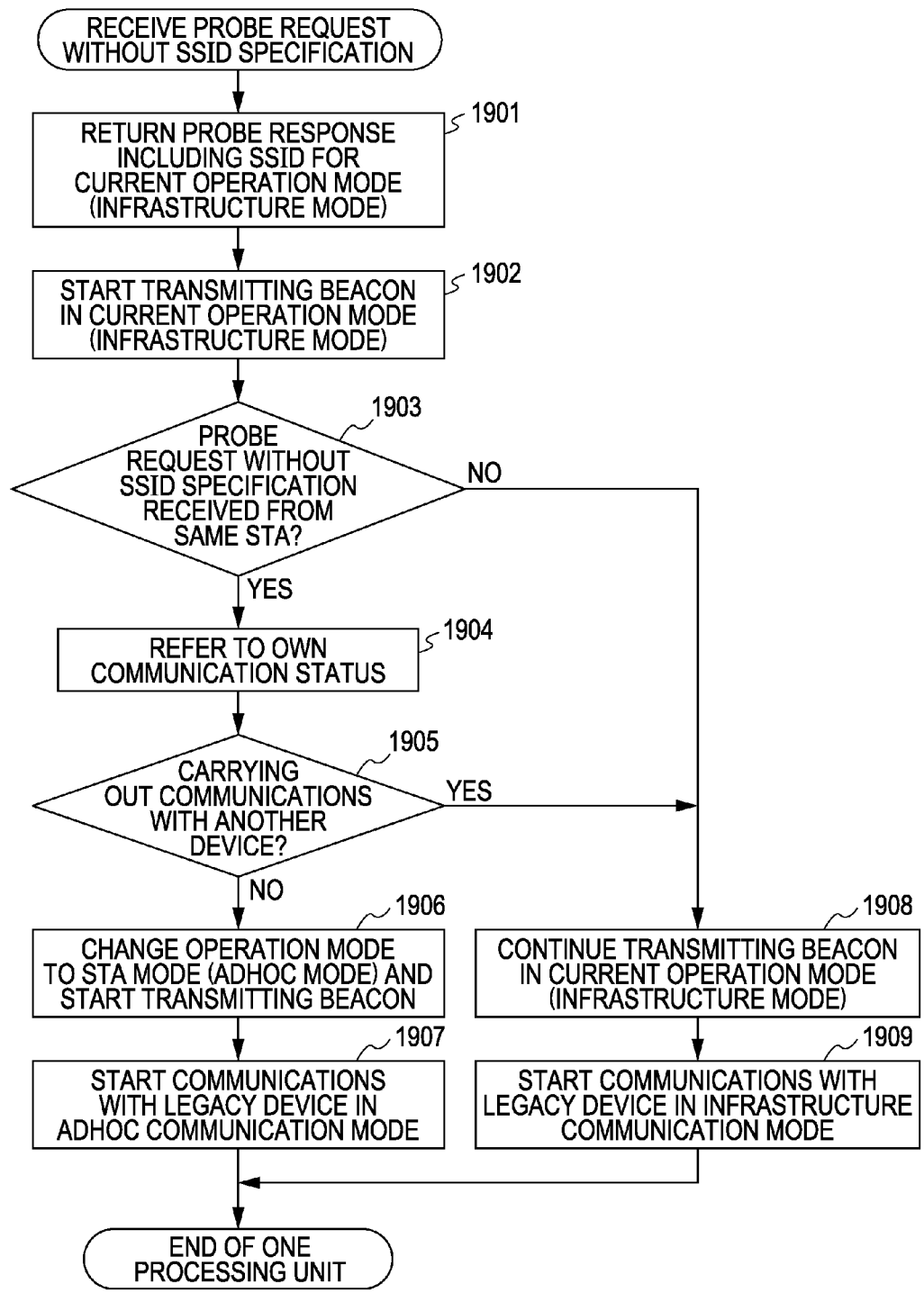
FIG. 19 is a flow of operation of the dual device in 607 to 613 and 605 and 606 in FIG. 6A.

FIG. 18 illustrates a flow of operation of the non-dual device and FIG. 19 illustrates a flow of operation of the dual device in 607 to 613 and 605 and 606 in FIG. 6A.

First, the non-dual device sends a probe request specifying an SSID for communications in the infrastructure mode (1801). Upon receiving the probe request, the dual device recognizes that negotiation for switching communication mode is started. Then, the dual device sends a probe response including an SSID for operation in the AP mode (the infrastructure mode) to the non-dual device (1901), and starts transmitting a beacon in the infrastructure mode (1902).

After receiving the probe response (1802), the non-dual device waits until a beacon including the SSID specified in 1801 is received (1803). When such a beacon is received, the non-dual device sends a probe request not specifying an SSID (1804).

Upon receiving the probe request not specifying an SSID, the dual device checks whether the source of the probe request is the same as the source of the previously received probe request specifying an SSID (1903).

When the source of the probe request is the same (Yes in 1903), the dual device recognizes that switching to the STA mode is requested, and refers to its own current communication status (1904). When the dual device is already carrying out communications with another device in the AP mode (Yes in 1905), the dual device maintains the current operation. That is, the dual device continues transmitting a beacon in the AP mode (the infrastructure mode) (1908). The dual device also continues transmitting a beacon in the AP mode (1908) when 1903 results in No.

When the dual device is not carrying out communications with another device (No in 1905), the dual device changes the operation mode to the STA mode, and starts transmitting a beacon in the adhoc mode. The beacon transmitted at this time includes the same SSID specified in 1901.

After sending a probe request not specifying an SSID (1804), the non-dual device checks whether a beacon for the adhoc mode including the SSID specified in 1801 is received (1805).

When such a beacon is received (Yes in 1805), the non-dual device starts communications with the dual device in the adhoc mode (1807, 1907). When such a beacon is not received (No in 1805), the non-dual device starts communications with the dual device in the infrastructure mode (1806, 1909).

Now, description returns to FIGS. 6A and 6B (600).

When the communication start request is issued by the dual device, the procedure branches according to whether the requested communication mode is the infrastructure mode or the adhoc mode (614).

When the communication mode requested by the dual device is the infrastructure mode, the dual device starts communications with the non-dual device in the infrastructure mode (614, 615). Then, the procedure proceeds to point C in FIG. 3.

When the communication mode requested by the dual device is the adhoc mode, the dual device starts a wait timer for the adhoc mode (616), and switches the operation mode to the STA mode (617).

When a connection with the non-dual device in the adhoc mode is established within a timer period (Yes in 618, No in 619), the dual device starts communications with the non-dual device in the adhoc mode (623). The procedure then proceeds to point D in FIG. 3.

When a connection in the adhoc mode is not established within the timer period (No in 618, Yes in 619), the dual device switches the operation mode to the AP mode to carry out communications in the infrastructure mode (620).

Then, communications are started in the infrastructure mode between the dual device and the non-dual device (621, 622). Then, the procedure proceeds to point C in FIG. 3.

Next, description will be given with reference to FIGS. 7A and 7B. As described earlier, FIGS. 7A and 7B illustrate flows of operation executed in a case where a communication start request is issued while the dual device is operating in the STA mode.

When a communication start request is issued while the dual device is operating in the STA mode, the procedure branches according to whether the request is issued by the non-dual device or the dual device (700).

When the request is issued by the non-dual device, if the communication mode requested by the non-dual device is the adhoc mode, communications are started immediately in the adhoc mode between the dual device and the non-dual device (701, 702). The procedure then proceeds to point D in FIG. 3.

When the request is issued by the non-dual device, if the communication mode requested by the non-dual device is the infrastructure mode, the procedure branches according to whether the non-dual device supports the message communications with the dual device regarding switching of communication mode (703).

As described earlier, the message communications in the present embodiment refer to negotiation between the non-dual device and the dual device regarding switching of communication mode, executed using a device searching message sequence (probe request/probe response) according to the IEEE 802.11.

When the non-dual device does not support the message communications with the dual device (No in 703), the dual device maintains the operation in the STA mode (704).

Then, the non-dual device detects a beacon for the adhoc mode (705), which is transmitted when the dual device is operating in the STA mode, thereby recognizing that the dual device is maintaining the STA mode. Then, when the non-dual device starts communications, the non-dual device starts communications in the adhoc mode (706). Then, the procedure proceeds to point D in FIG. 3.

When the non-dual device supports the message communications with the dual device (Yes in 703), the non-dual device sends a probe request not specifying an SSID (707).

Upon receiving the probe request (not specifying an SSID), the dual device determines whether the operation mode can be changed to the AP mode on the basis of the current communication status and the like (708).

When it is not allowed to switch to the AP mode (No in 709), the dual device returns a probe response including an SSID used for communications in the adhoc mode to the non-dual device (710). Then, the dual device carries out communications with the non-dual device in the adhoc mode (705, 706).

When it is determined that the operation mode can be changed to the AP mode (Yes in 709), the dual device returns a probe response including an SSID used for communications in the infrastructure mode to the non-dual device (711).

Then, the non-dual device sends a probe request specifying the SSID for communications in the infrastructure mode (712). Upon receiving the probe request, the dual device changes the operation mode to the AP mode (713). Then, communications are started in the infrastructure mode between the dual device and the non-dual device (714). Thus, the procedure proceeds to point C in FIG. 3.

Figure 16:
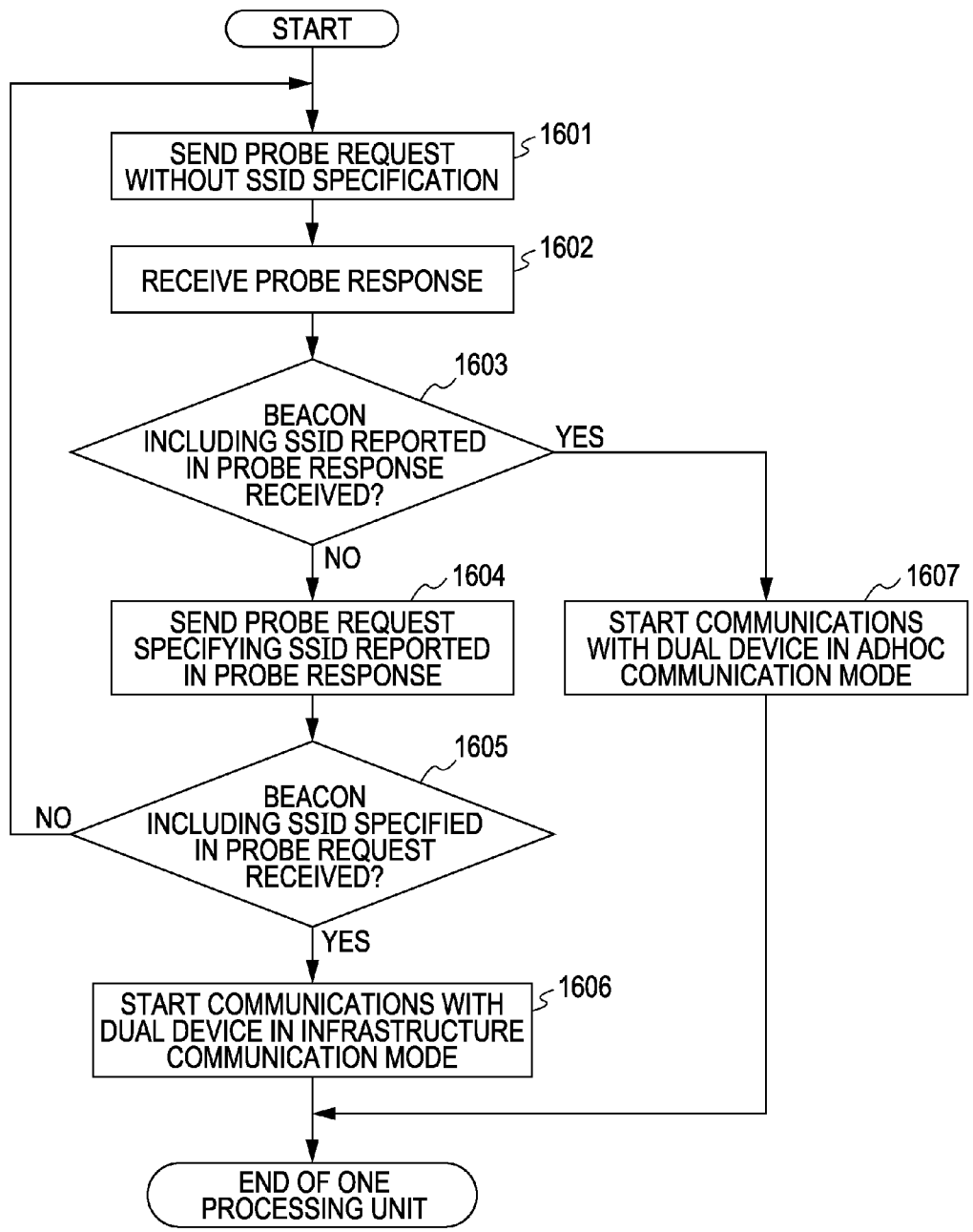
FIG. 16 is a flow of operation of the non-dual device in 707 to 714 and 705 and 706 in FIG. 7A.
Figure 17:
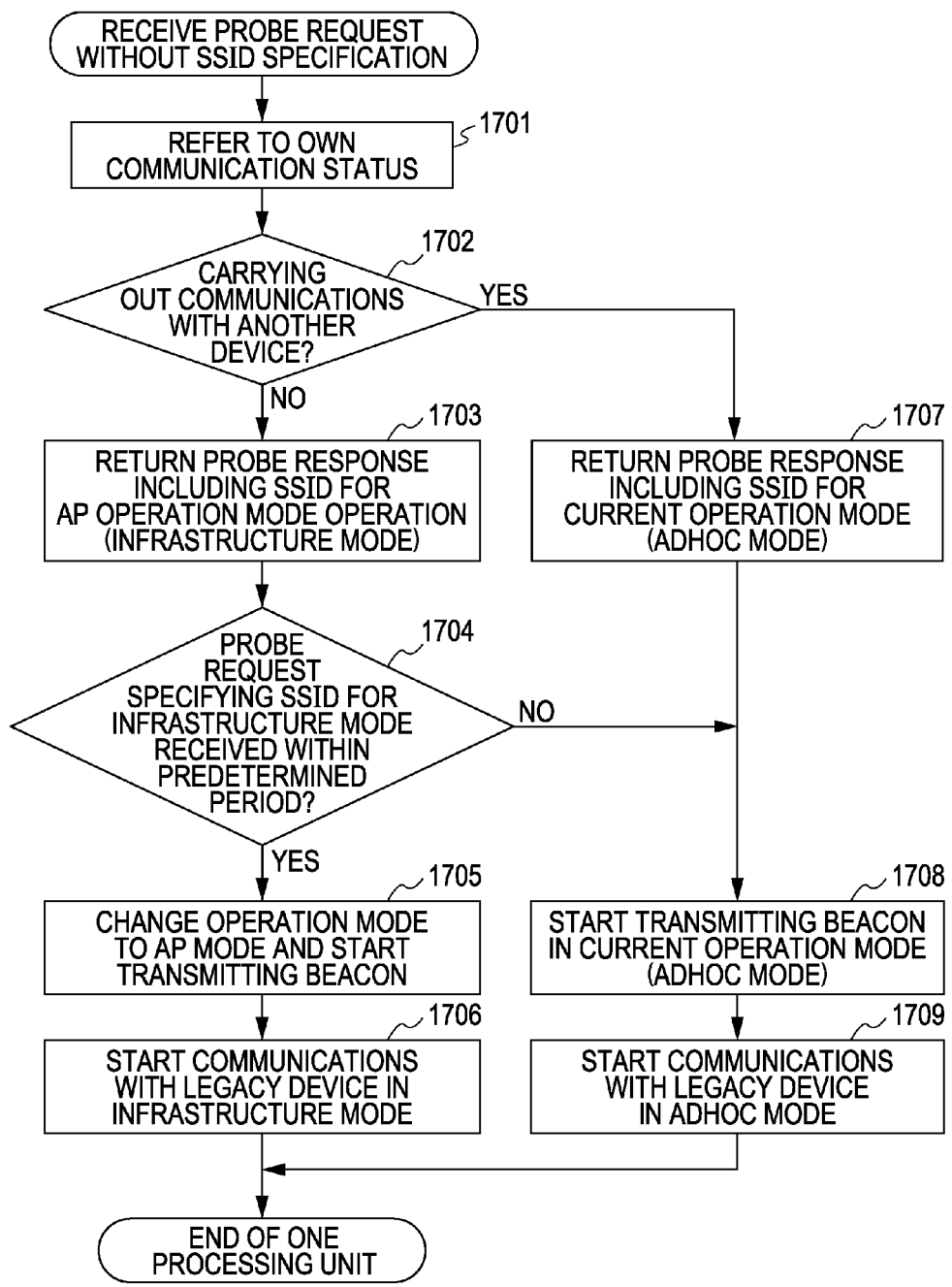
FIG. 17 is a flow of operation of the dual device in 707 to 714 and 705 and 706 in FIG. 7A.

FIG. 16 illustrates a flow of operation of the non-dual device and FIG. 17 illustrates a flow of operation of the dual device in 707 to 714 and 705 and 706 in FIG. 7A.

First, the non-dual device sends a probe request not specifying an SSID (1601). Upon receiving the probe request, the dual device recognizes that the non-dual device is requesting switching of operation mode, and refers to its own current communication status (1701).

When the dual device is not carrying out communications with another device (No in 1702), the dual device returns a probe response including an SSID used for operation in the AP mode (communications in the infrastructure mode) to the dual device (1703).

When the dual device is already carrying out communications with another device in the STA mode (Yes in 1702), the dual device returns a probe response including an SSID used for current communications (the adhoc mode) to the non-dual device (1707). Then, the dual device starts transmitting a beacon in the adhoc mode (1708).

Upon receiving the probe response sent by the dual device in 1703 or 1707 (1602), the non-dual device checks whether a beacon including the same SSID included in the probe response is received (1603).

When such a beacon is received (Yes in 1603), the non-dual device starts communications with the dual device in the adhoc mode (1607, 1709).

When such a beacon is not received (No in 1603) the non-dual device sends a probe request specifying the SSID included in the probe response received in 1602 (1604).

When the probe request is received within a predetermined period (Yes in 1704), the dual device changes the operation mode to the AP mode, and starts transmitting a beacon in the infrastructure mode (1705).

When a beacon including the same SSID specified in 1604 is received (Yes in 1605), the non-dual device starts communications with the dual device in the infrastructure mode (1606, 1706).

Now, description will be given referring back to FIGS. 7A and 7B (700).

When the communication start request is issued by the dual device, the procedure branches according to whether the requested communication mode is the infrastructure mode or the adhoc mode (715).

When the communication mode requested by the dual device is the adhoc mode, the dual device starts communications with the non-dual device in the adhoc mode (715, 716). Then, the procedure proceeds to point D in FIG. 3.

When the communication mode requested by the dual device is the infrastructure mode, the dual device starts a wait timer for the infrastructure mode (717), and switches the operation mode to the AP mode (718).

When a connection with the non-dual device in the infrastructure mode is established within a timer period (Yes in 719, No in 720), the dual device starts communications with the non-dual device in the infrastructure mode (724). Then, the procedure proceeds to point C in FIG. 3.

When a connection in the infrastructure mode is not established within the timer period (No in 719, Yes in 720), the dual device switches to operation mode to the STA mode to carry out communications in the adhoc mode (721).

Then, communications are started in the adhoc mode between the dual device and the non-dual device (722, 723). Then, the procedure proceeds to point D in FIG. 3.

According to the present embodiment, processing similar to the processing executed in the previous embodiment can be implemented using a message sequence defined in the IEEE 802.11. That is, by assigning new meanings for negation for switching of communication mode to predefined messages, advantages achieved with the previous embodiment can be similarly achieved in the present embodiment.

In the embodiments described above, the dual device determines whether the operation mode and communication mode can be changed by referring to its own communication status and checking whether the dual device is carrying out communications with another device. Alternatively, the dual device determines whether the operation mode and communication mode can be changed according to other criteria.

For example, the dual device may refer to a feeding condition, and allow switching to the AP mode when sufficient power is available (e.g., in the case of a commercial power supply or a battery with a sufficient capacity) while not allowing switching to the AP mode, in which power consumption is large, when sufficient power is not available. This is because the power consumption of the dual device increases in the case of the infrastructure mode since only a device operating in the AP mode transmits a beacon, in contrast to the case of the adhoc mode in which each device randomly transmits a beacon.

As for the non-dual device, power consumption is greater in the adhoc mode than in the infrastructure mode since a beacon is transmitted in the adhoc mode. Thus, when the non-dual device determines whether to allow switching of communication mode, for example, the non-dual device may allow switching to the adhoc mode when sufficient power is available, while not allowing switching to the adhoc mode when sufficient power is not available.

The embodiments have been described above in the context of examples of IEEE 802.11 wireless LANs. However, the present invention can be applied to other communication protocols. For example, the present invention can be applied to switching of operation mode between the master mode and the slave mode in IEEE 802.15 wireless PANs, and switching of communication mode between the hub-and-spoke and the point-to-point mode. Furthermore, the present invention can be applied to switching of operation mode between the host mode and the device mode and switching of communication mode between the hub-and-spoke mode and the point-to-point mode in wired bus networks, such as USB bus networks.

It is possible to provide each device in a system with a storage medium storing program code of software implementing the functions of the embodiments described above, so that a computer (CPU or MPU) controlling the system or device can read and execute the computer program stored on the storage medium. In this case, the functions of the embodiment described above are implemented by the program code read from the storage medium, so that the storage medium storing the program code falls within the scope of the present invention.

The storage medium for providing the program code may be, for example, a floppy disk, a hard disk, an optical disk a magneto-optical disk, a CD-ROM, a CD-R, a magnetic tape, a non-volatile memory card, a ROM, or a DVD.

Furthermore, instead of achieving the functions of the embodiments through execution of the program code by the computer, an operating system (OS) or the like running on the computer may execute part of or the entire processing according to instructions in the program code, thereby achieving the functions of the embodiments. This also falls within the scope of the present invention.

Furthermore, the program code read from the storage medium may be written to a memory of a function expansion board mounted on the computer or a function expansion unit connected to the computer so that a CPU or the like of the function expansion board or the function expansion unit can execute part of or the entire processing according to the program code, thereby achieving the functions of the embodiments. This also falls within the scope of the present invention.

According to the embodiments described above, if a communication mode of connection differs from a desired communication mode when the dual device and the non-dual device start communications, an appropriate communication mode can be determined based on the capability of the non-dual device, the current communication status, etc.

In the adhoc mode, since managing stations are absent, it is difficult to control security, such as exchange and management of an encryption key, so that the security level is often lower than in the infrastructure mode. Thus, when communications with high security are desired, it is possible to switch from the adhoc mode to the infrastructure mode.

In the infrastructure mode, a device operating in the AP mode is in charge of various management operations, so that the processing load and power consumption increase. Accordingly, it is possible to reduce the load of the device operating in the AP mode by switching from the infrastructure mode to the adhoc mode.

As described above, according to the embodiments, when a communication device having a plurality of operation modes and a plurality of communication modes switches the communication mode after connecting to another communication device, it is possible to change the operation mode.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method of enabling a communication device to communicate with another communication device, the communication device having a plurality of operation modes and a plurality of communication modes, the plurality of operation modes including a control station mode, in which the communication device operates as a control station in a wireless network and the plurality of communication modes including a first communication mode, in which a terminal station in a wireless network carries out communications via a control station, and a second communication mode, in which a plurality of terminal stations carry out communications without via a control station, the method comprising:
    determining a state of connection with a first other communication device in the first communication mode in a case where a communication request for requesting communications in the second communication mode is generated while the communication device is operating in the control station mode; and
    restricting switching the first communication mode to the second communication mode in a case where it is determined that the communication device is connected to the first other communication device in the first communication mode, and switches the first communication mode to the second communication mode in a case where it is determined that the communication device is not connected to the first other communication device in the first communication mode.

2. A non-transitory computer-readable storage medium storing a computer program for causing a computer to execute the method of claim 1.

3. A communication device having a plurality of operation modes and a plurality of communication modes, the plurality of operation modes including a control station mode, in which the communication device operates as a control station in a wireless network, and the plurality of communication modes include a first communication mode, in which a terminal station in a wireless network carries out communications via a control station, and a second communication mode, in which a plurality of terminal stations carry out communications without via a control station, the device comprising:
    a first determination unit configured to determine a state of connection with a first other communication device in the first communication mode in a case where a communication request for requesting communications in the second communication mode is generated while the communication device is operating in the control station mode; and
    a first control unit configured to restrict switching the first communication mode to the second communication mode in a case where the first determination unit determines that the communication device is connected to the first other communication device in the first communication mode, and switches the first communication mode to the second communication mode in a case where the first determination unit determines that the communication device is not connected to the first other communication device in the first communication mode.

4. The communication device according to claim 3, further comprising:
    a first receiving unit configured to receive a request for changing an operation mode from a second other communication device;
    a second determining unit configured to determine, based on a communication status or a status of power resources of the communication device, whether to allow changing the operation mode; and a switching unit configured to switch an operation mode according to a determination by the second determining unit.

5. The communication device according to claim 3, further comprising:
a request unit configured to request a second other communication device to change the communication mode when the communication device requests changing the communication mode; and
a third determination unit configured to determine, according to a response to the request for changing the communication mode, whether to allow changing the operation mode,
a switching unit configured to switch an operation mode according to a determination by the third determining unit.

6. The communication device according to claim 5, further comprising:
a decision unit configured to decide whether a second other communication device is capable of switching the communication mode when the communication device requests for changing the communication mode,
wherein the communication device requests the second other communication device to change the communication mode according to a decision result by the decision unit.

7. The communication device according to claim 3, further comprising:
a second receiving unit configured to receive a request for changing the communication mode from a second other communication device; and
a fourth determination unit configured to determine, according to a communication status or a status of power resources of the communication device, whether to allow changing the communication mode.

8. The communication device according to claim 3, further comprising:
a judging unit configured to judge whether the communication device is connected to the first other communication device;
a rejection unit configured to reject the request for changing the operation mode in a case where the communication device is connected to the first other communication device when the request for changing the operation mode is received from a second other communication device; and
a first communication unit configured to communicate with the second other communication device that has requested for changing the operation mode without changing the operation mode in a case where the request for changing the operation mode is rejected by the rejection unit,
a first switching unit configured to switch an operation m in a case where the communication device is not connected to the first other communication device when the request for changing the operation mode is received from the second other communication device.

9. The communication device according to claim 3, further comprising
a first switching unit configured to switch an operation and a communication mode in a case where the communication device is not connected to a third other communication device when the request for changing the operation mode is received from a second other communication device, and
wherein the communication device is configured to communicate with the second other communication device that has requested for changing the operation mode in the operation mode and the communication mode changed by the first switching unit.

10. The communication device according to claim 3, further comprising:
a judging unit configured to judge whether the communication device is connected to the first other communication device;
a rejection unit configured to reject changing the communication mode in a case where the communication device is connected to the first other communication device when a request for connection in a communication mode different from a communication mode set in the communication device is received from a second other communication device; and
a second communication unit configured to communicate with the second other communication device that has requested for connection without changing the communication mode in a case where changing the communication mode is rejected by the rejection unit,
a first switching unit configured to change the communication mode in a case where the communication device is not connected to the first other communication device when the request for connection in the communication mode different from the communication mode set in the communication device is received from the second other communication device.

11. The communication device according to claim 3,
wherein the communication device has the plurality of operation modes including a terminal station mode, in which the communication device operates as a terminal station in a wireless network controlled by a control station,
the communication device further comprising: an execution unit configured to execute negotiation for determining an operation mode of the communication device by directly communicating with the second other communication device;
a second control unit configured to start communications with the second other communication device in the second communication mode without executing the negotiation with the second other communication device in a case where the second other communication device transmits to the communication device a communication request for requesting communications in the second communication mode while the communication device is operating in the terminal station mode; and
a third control unit configured to start communications with the second other communication device in an operation mode determined according to a result of the negotiation executed by the execution unit in a case where the second other communication device transmits to the communication device a communication request for requesting communications in the first communication mode while the communication device is not operating in the terminal station mode.

12. The communication device according to claim 11, wherein the third control unit is configured to start communications with the second other communication device in an operation mode determined according to a result of the negotiation in a case where the second other communication device transmits to the communication device a communication request for requesting communications in the second communication mode while the communication device is operating in the control station mode.

13. The communication device according to claim 3, wherein the communication device communication has the plurality of operation modes including a terminal station mode, in which the communication device operates as a terminal station in a wireless network controlled by a control station.

14. The communication device according to claim 3, wherein the control station mode is a mode for operating as an access point defined by IEEE802.11.

15. The communication device according to claim 3, wherein the first communication mode is an infrastructure mode defined by IEEE802.11.

16. The communication device according to claim 3, wherein the second communication mode is an ad hoc mode defined by IEEE802.11.

17. The communication device according to claim 3, wherein the communication device communicates with the second other communication device in the first communication mode in a case where the first control unit restricts switching a communication mode of the communication device from the first communication mode to the second communication mode.

18. The communication device according to claim 3, wherein the communication device communicates with the first other communication device in the first communication mode in a case where the first control unit restricts switching a communication mode of the communication device from the first communication mode to the second communication mode.

19. The communication device according to claim 3, communicates with the second other communication device in the second communication mode in a case where the first control unit switches a communication mode of the communication device from the first communication mode to the second communication mode.

* * * * *